(12) United States Patent
Csank et al.

(10) Patent No.: US 10,592,622 B1
(45) Date of Patent: Mar. 17, 2020

(54) ASSESSMENT OF CONSERVATISM LEVEL IN AN AIRCRAFT TURBINE ENGINE DESIGN

(71) Applicant: United States of Americas as represented by the Administrator of NASA, Washington, DC (US)

(72) Inventors: Jeffrey T. Csank, Parma, OH (US); Sanjay Garg, Westlake, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 270 days.

(21) Appl. No.: 15/722,152

(22) Filed: Oct. 2, 2017

Related U.S. Application Data

(63) Continuation-in-part of application No. 14/922,260, filed on Oct. 26, 2015, now abandoned.

(60) Provisional application No. 62/402,139, filed on Sep. 30, 2016, provisional application No. 62/068,158, filed on Oct. 24, 2014.

(51) Int. Cl.
   *G06F 17/50* (2006.01)
   *G01M 15/14* (2006.01)
   *F04D 27/00* (2006.01)

(52) U.S. Cl.
   CPC ........ *G06F 17/5009* (2013.01); *F04D 27/001* (2013.01); *G01M 15/14* (2013.01)

(58) Field of Classification Search
   CPC ..... F04D 27/001; G05B 23/0294; F02C 9/00; F02C 9/32; B64C 21/04; F01D 15/10; G01M 15/14; F02B 37/12
   See application file for complete search history.

(56) References Cited

U.S. PATENT DOCUMENTS

| | | | | |
|---|---|---|---|---|
| 5,447,283 A | * | 9/1995 | Tindell | B64C 21/04 244/207 |
| 6,141,951 A | * | 11/2000 | Krukoski | F04D 27/001 60/772 |
| 2004/0216457 A1 | * | 11/2004 | Shea | F02B 37/12 60/608 |
| 2010/0269481 A1 | * | 10/2010 | Snider | F02C 9/00 60/39.24 |
| 2011/0138765 A1 | * | 6/2011 | Lugg | F01D 15/10 60/39.01 |
| 2011/0208400 A1 | * | 8/2011 | Lickfold | F02C 9/32 701/100 |
| 2013/0220004 A1 | * | 8/2013 | Epstein | G01M 15/14 73/112.01 |
| 2014/0271114 A1 | * | 9/2014 | Phillips | G05B 23/0294 415/1 |

* cited by examiner

*Primary Examiner* — Kandasamy Thangavelu
(74) *Attorney, Agent, or Firm* — Robert H. Earp, III; William M. Johnson

(57) ABSTRACT

A system and method of analyzing an engine model is disclosed. The system and method include performing a Dynamic Systems Analysis on the engine model that includes modifying a transient allowance of the engine model to determine an optimal balance between performance and operability and assessing the conservatism level of the engine model.

18 Claims, 17 Drawing Sheets

ASSESSMENT OF CONSERVATISM LEVEL IN AN AIRCRAFT TURBINE ENGINE DESIGN

CROSS-REFERENCE TO RELATED APPLICATIONS

This application claims the benefit of U.S. Provisional Patent Application Ser. No. 62/402,139 entitled "A Metric to Assess the Level of Conservatism in an Aircraft Turbine Engine Design" filed on Sep. 30, 2016 and is a Continuation-in-Part of U.S. application Ser. No. 14/922,260 entitled "System and Method for Analyzing Turbine Engine Dynamic Capability" filed on Oct. 26, 2015, which claims the benefit of U.S. Provisional Patent application Ser. No. 62/068,158 entitled "Mechanism For Analyzing Turbine Engine Dynamic Capability" filed on Oct. 24, 2014. The entirety of each of the above-noted applications is incorporated herein by reference.

ORIGIN OF THE INVENTION

The invention described herein was made by employees of the United States Government and may be manufactured and used by of for the Government for Government purposes without the payment of any royalties thereon or therefore.

BACKGROUND

The aircraft engine design process seeks to achieve the best overall system-level performance, weight, and cost for a given engine design. This is achieved by a complex process known as systems analysis (SA), where steady-state simulations are used to identify tradeoffs that should be balanced to optimize and evaluate individual technology benefits offered by the system. When applied to aviation propulsion systems, these analyses produce results that help guide technology investment, architecture, and program planning and formulation throughout the life of the program. The steady-state simulations and data on which systems analysis relies, however, may not adequately capture the true performance trade-offs that exist during transient operation.

There are a number of tools available for SA that may be used to determine the steady-state performance of a conceptual design, such as custom cycle decks, which are steady-state engine models typically developed by engine manufacturers, and the Numerical Propulsion System Simulation (NPSS). These tools can be integrated with other processes to perform a steady-state system-level optimization. During these simulations, an engine model is driven to specific power reference values, typically defined by fuel flow, thrust, or fan speed, and the engine and engine components' data are recorded for analysis. This analysis usually includes several specific flight conditions of importance, such as at takeoff and cruise. The engine components' actual transition from one operating point to another, however, is not taken into consideration by traditional systems analysis.

Aircraft engine design requires assessment and analysis of the relationship between the design constraints (e.g., high pressure compressor surge margin) and performance (e.g., time response) throughout the engine life cycle while including engine degradation information and leave room for acceptable margins. The mechanism for analyzing turbine engine dynamic capability analyzes the trade off between the design constraint and performance but typically only considers a single engine degradation. When engine degradation level is added, it is more difficult to see the true trade off. With engine degradation information added, clusters form around each design point and it is difficult to analyze worst case scenarios.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In one aspect of the innovation, the innovation overcomes the above mentioned disadvantages by providing an innovative method of analyzing engine performance comprising, designing an initial engine model, designing a controller for the initial engine model, modifying a transient allowance limiter requirement of the initial engine model, creating a modified engine model, testing a controller of the modified engine model using the modified transient allowance limiter to determine changes to the performance and/or operability of the modified engine model from the initial engine model, determining if a designer defined number of modifications is satisfied, and repeating the method beginning at modifying a transient allowance limiter of the initial engine model if the designer defined number of modifications is not satisfied.

In another aspect of the innovation, the innovation overcomes the above mentioned disadvantages by providing an innovative system of analyzing an engine model to improve performance and operability comprising: a processor that executes the following computer executable components stored in a memory, a first design component that allows a designer to create an initial engine model, a first modification component that modifies a transient allowance limiter requirement of a limiter of the initial engine model, a second design component that designs a new limiter based on the results of the first modification component thus, creating a modified engine model, a testing component that allows the designer to test the new limiter, an analysis component that analyzes the results and determines if the results meet performance and/or operability requirements, and a second modification component that modifies the initial engine model if the analysis component determines that the results are unacceptable.

Current aircraft propulsion systems are designed using system analysis which relies on system-level simulations to evaluate the performance, weight, and cost of a given design, typically done with steady state performance for a single snap shot of the engine life cycle. For complex systems, such as aircraft engines, the capability to meet transient performance requirements over a wide operating envelope and a long operating life is crucial. These steady-state performance based system analysis approaches do not capture the capability of a system to meet such requirements. When assessing technologies for system performance improvement, it is quite possible that a configuration that looks good from a steady-state performance at a single life cycle point perspective might be more challenging to control to meet transient and safety requirements throughout the entire life cycle. In addition, these systems may carry additional unnecessary margin reducing the efficiency and effectiveness of the propulsion system. To help address this need, a metric to assess the level of conservatism in the engine design has been developed.

According to an aspect, the innovation provides a process to compare the minimum distance between the design constraint of interest, typically high pressure compressor surge margin, and performance, mainly settling time or rise time, for varying acceleration limits once engine degradation information is added to the model. By defining an acceptable region representing how close the designer would like to operate near the design constraint and performance goal, the user could better quantify how much the design margins need to be modified to meet these goals based on worst case information.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
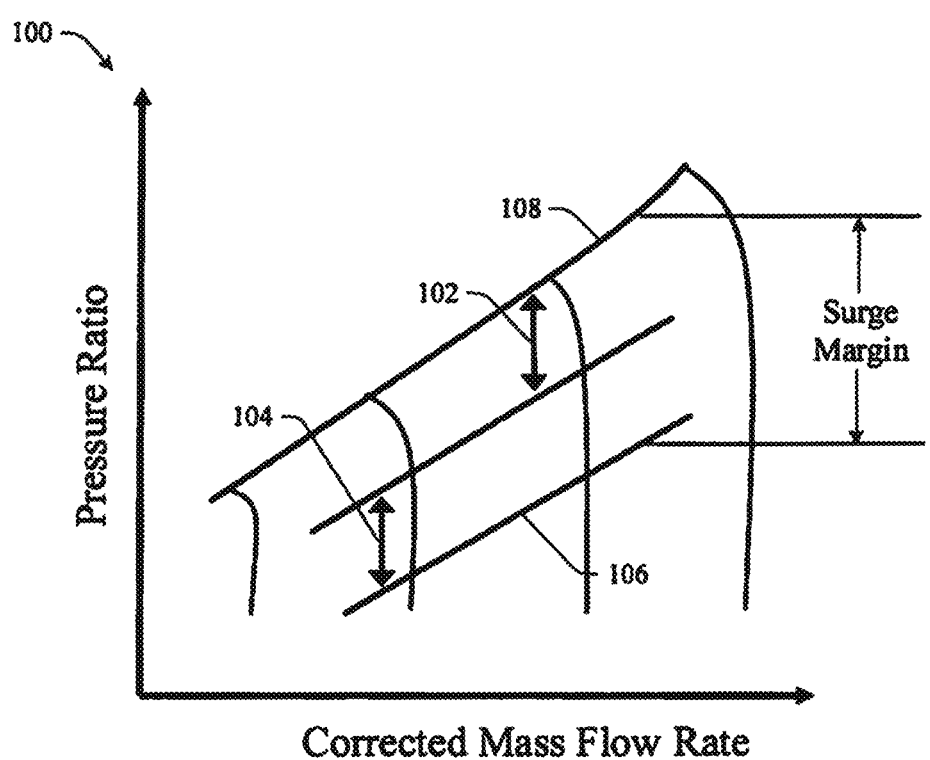
FIG. 1 is a graphical illustration of a high-pressure compressor (HPC) map illustrating a steady state surge margin in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative system and method to evaluate a dynamic capability of a conceptual engine design early in the design process before advanced engine models are developed. More specifically, a Dynamic Systems Analysis (DSA) is disclosed that overcomes the above mentioned disadvantages and that includes a Tool for Turbine Engine Closed-loop Transient Analysis (TTECTrA) that aids in the design of a power management controller to regulate thrust, and a transient limiter to protect the engine model from surge at a single flight condition (defined by an altitude and Mach number). Simulation results of TTECTrA may be used to estimate the dynamic performance of the model. Traditional System Analysis (SA) is a process that uses steady-state simulations to identify tradeoffs that should be balanced to optimize the system. The steady-state simulations and data on which systems analysis relies may not adequately capture the true performance trade-offs that exist during transient operation. DSA provides the capability for assessing trade-offs at an early stage of an engine design process by incorporating dynamic performance data with the steady-state data used in SA.

As mentioned above, traditional SA does not take into account the actual dynamic characteristics of the engine design. Thus, the designers may be using conservative constraints and, therefore compromising peak performance in their engine design. A turbine engine is designed to satisfy criteria ranging from system-level objectives (weight, thrust, and fuel burn rate goals) to component and sub-component-level limits (on efficiency, rotor speed, pressure, and temperature). These objectives are usually evaluated in steady-state. Safe operation of an engine requires that operating margins, such as surge margin, are not exceeded during the transition from one operating point to another. These margins take into consideration off-nominal operation due to engine degradation, atmospheric disturbances, vehicle maneuvers, angle-of-attack, etc., and attempt to account for dynamic changes as well.

Current steady-state SA is not adequate for evaluating the ability of advanced technologies to meet transient performance requirements without better-defined requirements for the component operating margins. The dynamic performance of a design is only observed through the use of detailed physics-based models of the engine components along with a detailed controller. The development and maturation of these models and controller are typically done later in the design process, offering little opportunity for information regarding the dynamic capabilities of the engine to influence the design process.

Designing an engine component through SA to meet both system and component-level objectives yields steady-state operating data representing the best performance given the design constraints. For example, a design constraint for a compressor is the surge margin, which is the distance the compressor operates from the surge line. The target operating line in a compressor, the relationship between corrected flow through and the pressure ratio across the compressor, is designed such that the compressor operates the most efficiently while still meeting the constraints; this corresponds to the lowest acceptable surge margin in steady-state.

Current SA requires extensive analysis of trade-offs in order to optimize the system and evaluate individual technology benefits. When applied to aviation propulsion systems, these analyses produce results that help guide technology investment, system architecture, and program planning and formulation throughout the life of the program.

The aircraft propulsion system is designed to meet requirements ranging from system-level objectives (weight, thrust, fuel burn, etc.) to component and sub-component-level constraints (stresses, rotating component surge margin, etc.). The propulsion system is designed to meet these objectives at the design point, also referred as the on-design, which is typically a cruise condition since optimizing the fuel burn rate at cruise provides the most economic benefit; the majority of fuel and time is spent at cruise. The engine model can then be analyzed at other flight conditions, such as takeoff or climb, to determine how the model operates at these conditions, known as off-design or off-nominal. Both the on-design and off-design conditions are evaluated with steady-state data.

In order to maintain safe operation, the engine must not exceed any of its constraints; including when transitioning from one flight condition or operating point to another. Operating margins are defined to consider both off-nominal steady-state operation due to engine degradation, atmospheric disturbances, vehicle maneuvers, angle-of-attack, etc., and attempt to account for changes due to transitioning between operating points (dynamic) by adding in extra margin. However, defining and analyzing the operating margins based only on steady-state simulation data offers little opportunity for information regarding the actual dynamic capabilities of the engine to influence the design process, such as the time it takes to spool the engine up and remaining surge margin The aircraft engine design process seeks to optimize the overall system-level performance, weight, and cost for a given concept. Steady-state simulations and data are used to identify trade-offs that should be balanced to optimize the system in a process known as systems analysis. These systems analysis simulations and data may not adequately capture the true performance trade-offs that exist during transient operation.

The idea behind dynamic systems analysis (DSA) is to analyze the dynamic performance of the engine and determine if the current constraints are appropriate. Open-loop dynamic simulations provide insights into engine transient performance, but they do not capture the necessities of transient performance under the constraints imposed by limit regulation, which always must be included in the engine system. Closed-loop simulations containing a controller designed to protect violating any operational constraints, which are heavily influenced by transient operation, must be conducted.

According to an aspect, the innovation provides dynamic systems analysis for assessing the dynamic trade-offs at an early stage of the engine design process.

In one aspect, the innovation relies on the Tool for Turbine Engine Closed-loop Transient Analysis (TTECTrA) that provides a user with an estimate of the closed-loop performance (response time) and operability (high pressure compressor surge margin) for a given engine design and set of control design requirements. In one embodiment, TTECTrA along with engine deterioration information, can be used to develop a more generic relationship between performance and operability that can impact the engine design constraints and potentially lead to a more efficient engine.

Referring now to the drawings, FIG. 1 is a graphical illustration of a high-pressure compressor (HPC) map (pressure ratio vs. corrected mass flow rate) 100 illustrating a steady state surge margin. The steady-state surge margin accounts for two types of surge margin reduction: 1) the uncertainty allowance 102 and 2) the transient allowance 104. The uncertainty and transient allowances 102, 104 affect the transient performance, safety, and efficiency of the engine but, cannot be analyzed individually with steady-state data. The uncertainty allowance 102 represents the maximum reduction anticipated in surge margin due to mechanical imperfections and tolerances (engine-to-engine variation), Reynolds Number effects, inlet distortion, tip clearances, and engine degradation (or aging), etc. The transient allowance 104 accounts for the reduction in surge margin that occurs during the transition from one operating point to another.

Still referring to FIG. 1, combining the uncertainty allowance 102 and transient allowance 104 produces a target operating line 106 in the HPC map 100. If the uncertainty and transient allowances 102, 104 are defined correctly, a new engine operating in normal conditions (no engine damage or severe faults) at steady-state will do so along the target operating line 106 without entering a surge condition. If the engine operates above a surge line 108 and not along the operating line 106, the engine will enter the surge condition.

The total surge margin allowance (sum of the uncertainty and transient allowances 102, 104), is determined based on historical data and generic rules-of-thumb. Even though this process produces compressor designs that provide adequate steady-state performance, the system may be designed to operate with a transient allowance that could turn out to be too small or too large. Even though the surge margin allowances could be adjusted later in the design process, before production begins, not accounting for this in the SA phase could potentially result in a performance reduction. With the total surge margin allowance fixed, if the transient allowance is defined too large, during a large transient the engine (compressor) may operate closer to the surge line than intended, potentially leading to compressor surge, particularly in off-nominal operation with a degraded engine. Conversely, a transient allowance that is defined too small could produce an overly-conservative engine response that may be unable to meet Federal Aviation Administration (FAA) Federal Aviation Regulations.

While SA may indicate that a specific engine design operates at a high efficiency for a defined operating line (surge margin allowance), DSA reveals that this increased efficiency comes at the cost of an unacceptable decrease in transient performance or an unacceptable surge margin reduction in order to meet the transient performance requirement. This delicate balance between performance and operability, in terms of transient response and other factors such as efficiency and safety, should be accounted for more accurately as may be accomplished through modeling of the closed-loop dynamic response of the system.

DSA requires that a control system can be modeled and that a dynamic engine model, containing at least rotor speed states, is available. The dynamic performance of an engine is regulated by a closed-loop controller designed to ensure that the engine is capable of moving from one operating point to another while maintaining adequate operability margins. These margins are preserved through the inclusion of limiters in the controller, but not all of the limiters have a large impact on the closed-loop dynamic performance. The limiters that protect the engine's physical bounds, such as rotor speeds and pressures, primarily affect the amount of thrust produced but not the transition between operating points. To capture the relevant impact of the controller on the overall system performance for DSA, a simplified controller containing only the structure that directly impacts the transient response of the engine is included in the simulations. TTECTrA provides this capability by integrating a controller with an engine model and design that meets performance specifications, such as bandwidth and operability margin limits. With this controller, TTECTrA provides an estimate of the transient capability of the conceptual engine design at a given flight condition. Since this analysis does not require the full-envelope nonlinear controller to be designed, the time and effort required to obtain the transient data are reduced, making DSA more accessible earlier in the engine design process.

Any tool used for transient analysis must be able to model the dynamic operation of an aircraft engine, which is dependent on the closed-loop controller. From a high-level perspective, the engine controller can be considered to perform two functions: power management and engine protection. The power management function regulates the controlled variable (typically engine pressure ratio or fan speed) based on the thrust commanded by the pilot via the throttle. The engine protection controller ensures that the engine does not violate any physical bounds, such as those on the rotor speeds and pressure, and ensures safe operation by avoiding compressor surge and engine flame out. The power management and engine protection controllers are integrated via min/max logic. The min/max logic compares the output of each individual controller to determine which is closest to meeting its setpoint, and then selects this as the control input to the engine. For DSA, it is necessary to consider the impact of both the power management function and the engine protection function on the transient operation of the engine.

Figure 2A:
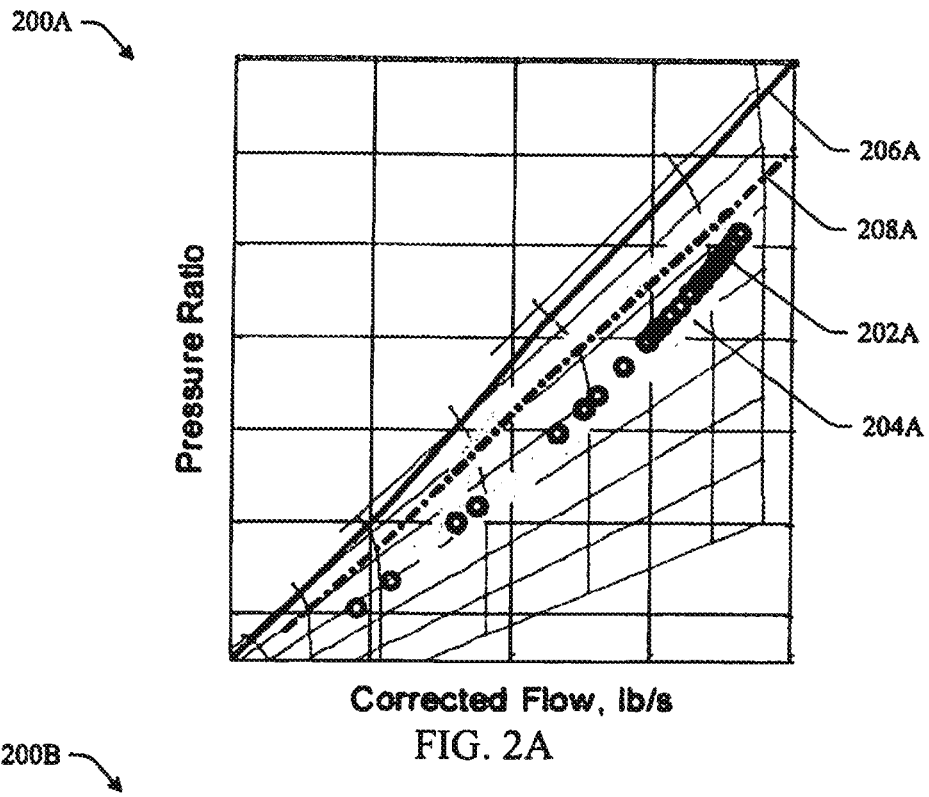
FIGS. 2A and 2B are illustrations of a high-pressure compressor map and a low-pressure compressor map respectively for an engine model comparing Systems Analysis and Dynamic Systems Analysis (DSA) in accordance with an aspect of the innovation.
Figure 2B:
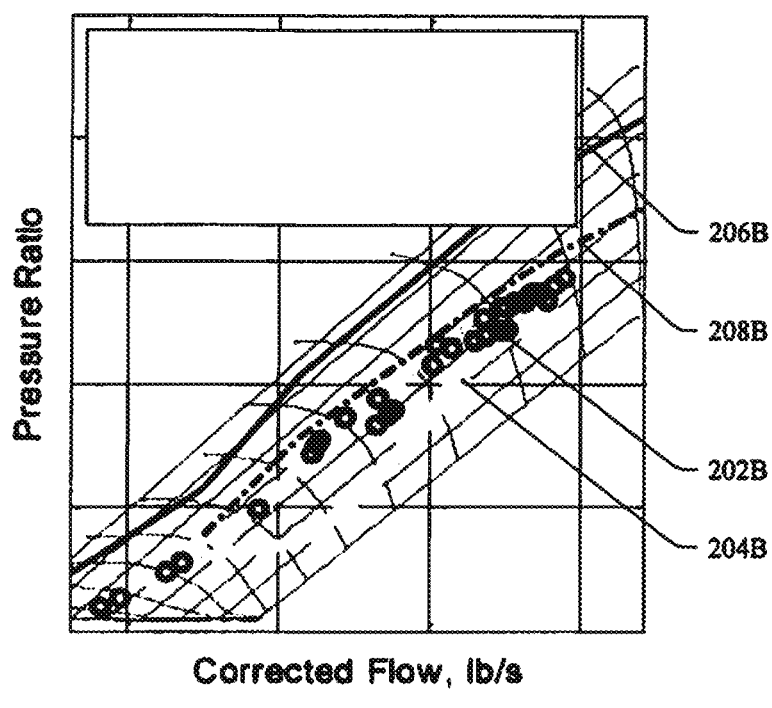

As mentioned above, the main objective of DSA is to incorporate dynamic performance data with the steady-state data used in traditional SA. These transient operating data can include but are not limited to pressures, temperatures, and surge margins of the engine components. For example, FIGS. 2A and 2B, illustrate maps for the HPC 200A and LPC 200B respectively in a high-bypass two-spool turbofan engine, where SA data (circles) 202A, 202B and DSA data (dots) 204A, 204B are plotted in relation to the surge line (solid line) 206A, 206B and uncertainty allowance (dash-dotted line) 208A, 208B. The DSA data 204A, 204B was obtained by applying a burst-and-chop thrust profile at a takeoff flight condition. Assuming that the operating line defined by the SA data 202A meets the designed surge margin allowance, it can be seen from FIG. 2A that this large engine transient causes a small violation of the transient allowance in the HPC 200A. This implies that, at this particular flight condition, an engine operating under worst-case conditions (used to define the uncertainty allowance) may operate on or over the surge line.

Figure 3:
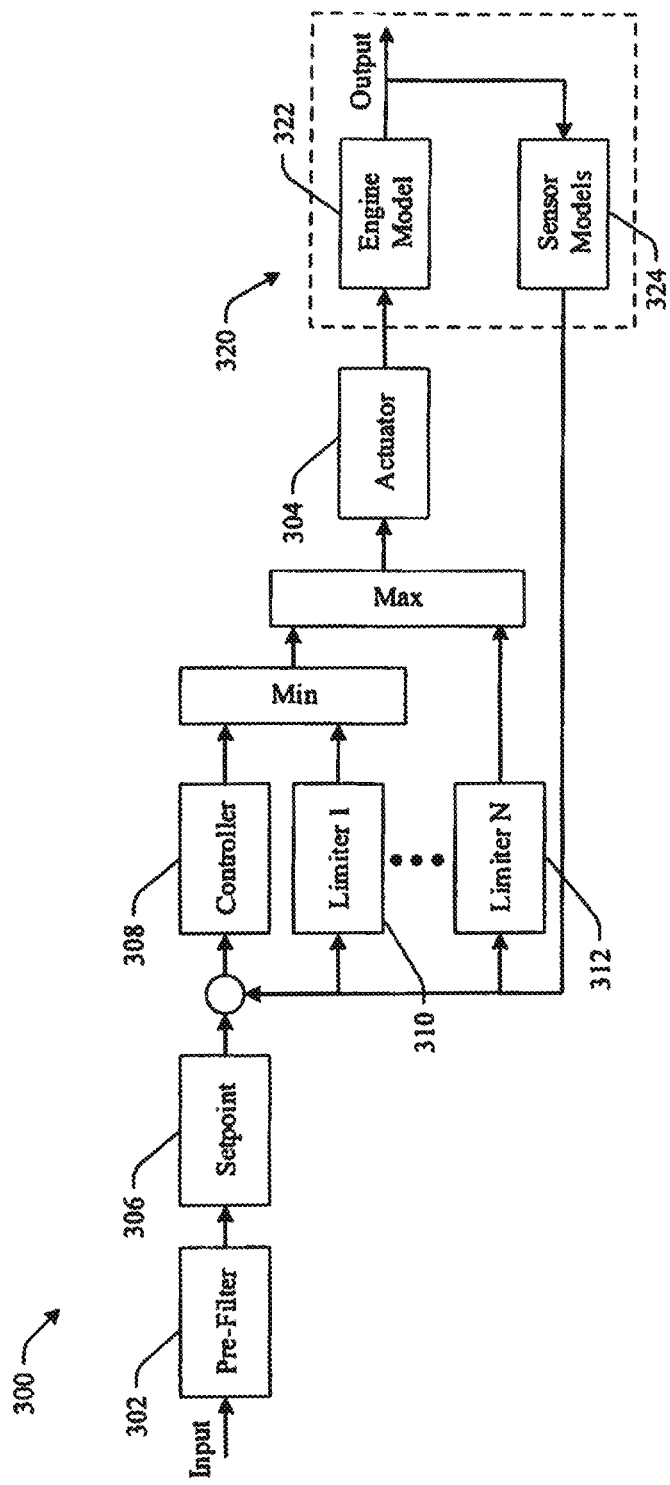
FIG. 3 is a schematic illustration of an innovative closed-loop architecture in accordance with an aspect of the innovation.

Based on this data, there are three possible choices to make regarding this engine design: 1) increase the transient allowance; 2) accept small violations of the uncertainty allowance; 3) or modify the transient limiter in the controller 300 (see FIG. 3). Each choice, however, has drawbacks. 1) By moving the steady-state operating line farther from the surge line and increasing the transient allowance, the efficiency of the system would be reduced. 2) Allowing small violations of the uncertainty allowance requires accepting that the uncertainty allowance is overly conservative and can be safely reduced. 3) Modifying the transient limiter to slow the engine response, the engine response must still be able to meet FAA requirements. The drawbacks related with the third choice, however, can be addressed by using TTECTrA, which enables investigation of the trade-off between response time and surge margin in evaluating an engine design.

TTECTrA was developed to demonstrate and estimate the dynamic performance of the closed-loop system through the design of a simple controller. TTECTrA is a semi-automated control design tool that can be easily integrated with subsonic turbine engine simulations. At a single flight condition, defined by an altitude and Mach number, TTECTrA is capable of automatically designing a controller containing only the fundamental limiters that affect the transient performance based on the design specifications. Simulation of the engine model with this controller allows for the collection of realistically achievable dynamic performance data for the design.

FIG. 3 illustrates the architecture of the TTECTrA controller 300. The controller 300 includes a pre-filter 302 subsystem and an actuator subsystem 304 that are implemented as unity gain first order filters with user-defined bandwidths. The controller 300 further includes a setpoint subsystem 306 that is designed by the controller 300. More specifically, the setpoint subsystem 306 is an empirically derived relationship between thrust and control variable, which is model dependent (typically fan shaft speed or engine pressure ratio). A Proportional-Integral (PI) controller 308 is included and calculates gains to meet the user defined bandwidth requirements.

The controller further includes multiple limiters (limiter 1 through limiter N) that are designed using TTECTrA. In the example embodiment described herein and illustrated in the figures, the limiters are transient allowance limiters and more specifically, an acceleration limiter 310 and a deceleration limiter 312. The acceleration limiter 310 limits a reduction to the surge margin to prevent the engine model from entering a surge condition. It is to be understood, however, that any type of limiter associated with a transient allowance of the engine can be used. Thus, the innovation is not dependent on the type of limiter(s) and thus, the example embodiment described herein and illustrated in the figures is for illustrative purposes only and is not intended to limit the scope of the innovation. The acceleration limiter 310 is designed to prevent the HPC from surging during engine acceleration by restricting the fuel flow delivered to the engine and to prevent a high pressure turbine inlet temperature (T40) from exceeding its limit. This maintains the core shaft acceleration below its limit for a given core speed. The deceleration limiter 312 preserves a minimum surge margin in the LPC through a limit on the relationship of fuel flow divided by the compressor static discharge pressure and prevents it from exceeding a minimum fuel to air ratio. The TTECTrA controller 300 contains a simulation block 320 where the user can integrate their initial engine model 322 in the simulation block 320. The simulation block 320 further contains sensor models 324 and other functions that produce the inputs (feedback) necessary for designing the setpoint subsystem (controller) 306.

Figure 4:
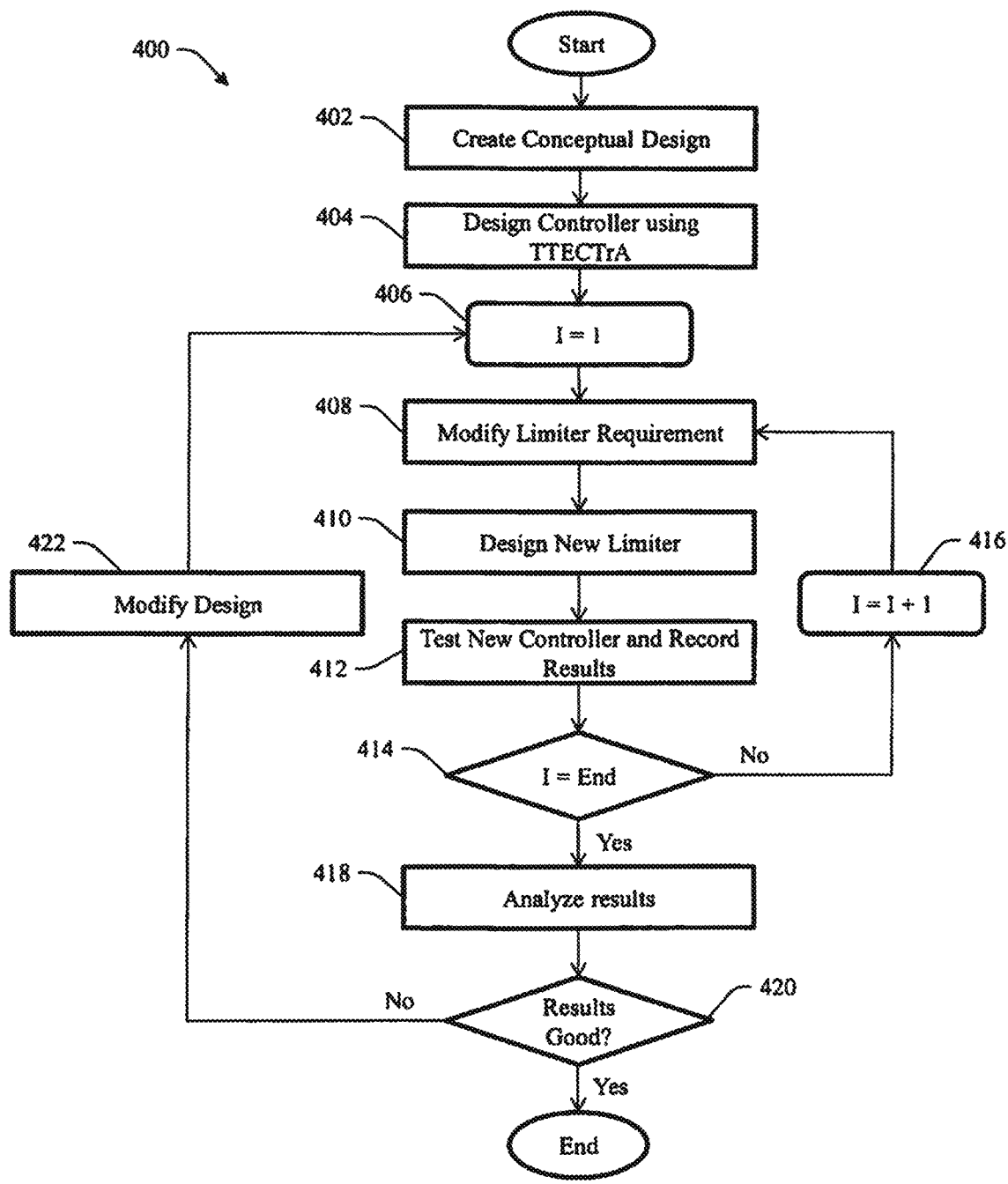
FIG. 4 is a flow chart illustrating a method of dynamic systems analysis in accordance with an aspect of the innovation.

FIG. 4 is a flow chart illustrating a method 400 of analyzing engine performance utilizing DSA and TTECTrA. At 402, an initial (or original) engine model 322 is designed and incorporated into the simulation block 320. Designing the initial engine model 322 includes determining a surge margin allowance, uncertainty allowances, transient allowances, and target operating line as described herein. At 404, a controller for the initial engine model is designed using TTECTrA, as defined herein. At 406, a designer defined iteration (or counter) is created that allows the designer to define the number of modifications the designer wants to perform on the initial engine model. At 408, the HPC requirement is modified. More specifically, the surge margin allowance is adjusted (reduced) to increase/decrease the acceleration (or response time) of the engine in order to achieve an optimum balance between performance and operability. At 410, TTECTrA modifies the limiter (e.g., acceleration limiter) 310 thereby creating new limiter based on the modified HPC requirement thus, creating a modified engine model. At 412, the controller with the new limiter 310 is tested and the results are recorded. At 414, a decision is made to determine if the iteration is equal to the number of iterations (modifications), as defined by the designer (I=End). If the determination is no, then at 416, the iteration increases by one and the method returns to 408 and the process repeats. If at 414, the determination is yes, then at 418, the results are analyzed and at 420, a decision is made to determine if the results are acceptable. If the determination is no, then at 422, the initial engine model is modified and the method returns to 406 and the process is repeated. If at 420, the determination is yes, the process ends.

Using the flow chart illustrated in FIG. 4, the designer can consider trade-offs and determine if a conceptual engine design with a fixed steady-state surge margin constraint, is capable of meeting the transient performance requirements, or if the steady-state surge margin constraint must be modified. The designer can also consider accepting a slightly less performing engine that still meets the transient requirement and obtaining additional margin. In this case where the designer chooses to accept a less performing engine that still meets the requirement, the designer may choose to reduce the surge margin constraint, redesign the engine, and perform the analysis (both steady-state and dynamic) with the modified design using the new constraint.

Figure 5:
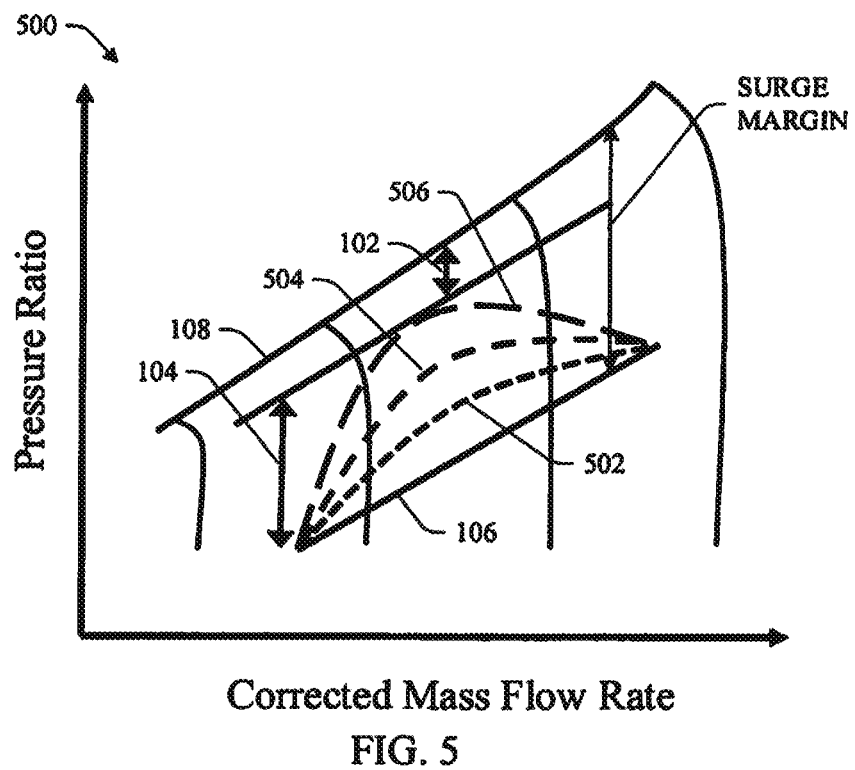
FIGS. 5 and 6 are example plots showing data obtained by the Dynamic Systems Analysis in accordance with an aspect of the innovation.
Figure 6:
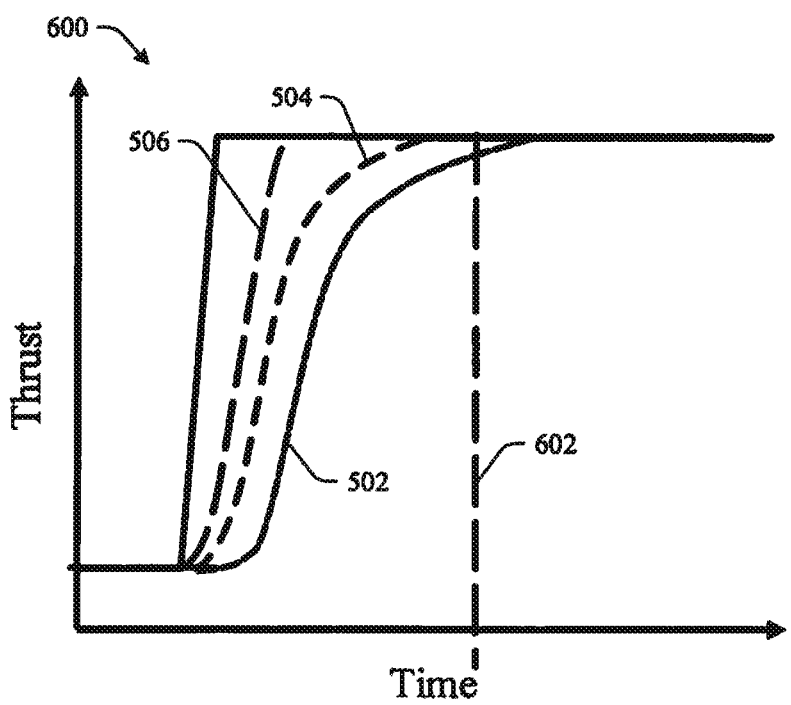

FIGS. 5 and 6 are example plots showing data obtained by the process 400 described above in relation to FIG. 4. FIG. 5 is an HPC map 500 that shows the surge margin allowance comprised of the uncertainty allowance 102 and the transient allowance 104, the target operating line 106, and the surge line 108. FIG. 6 is an acceleration graph 600 that shows a performance parameter (requirement) 602 that the engine model is required to meet. For example, the engine model may be required to have a response time (acceleration) in a predetermined period of time (e.g., 5 seconds) and/or meet a minimum surge margin (e.g., 9%, 10%, 11%, etc.).

Both plots also illustrate responses determined from performing the process 400 above. Each response is representative of one iteration performed by the TTECTrA controller 300. For example, a first iteration (short dashed line) 502 shows a small sacrifice in the surge margin and a slow acceleration that does not meet the performance parameter. The second iteration (medium dashed line) 504 shows a larger sacrifice in the surge margin and a faster acceleration time that meets the performance parameter. The third iteration (long dashed line) 506 shows the largest sacrifice in the surge margin and the fastest acceleration time that meets the performance parameter. Although, the third iteration 506 has the fastest acceleration time while remaining below the surge line 108, the designer must determine if the response is the optimum balance between performance and operability. In other words, since the second iteration 504 also meets the performance parameter 602, the second iteration may be the optimum engine model.

Figure 7:
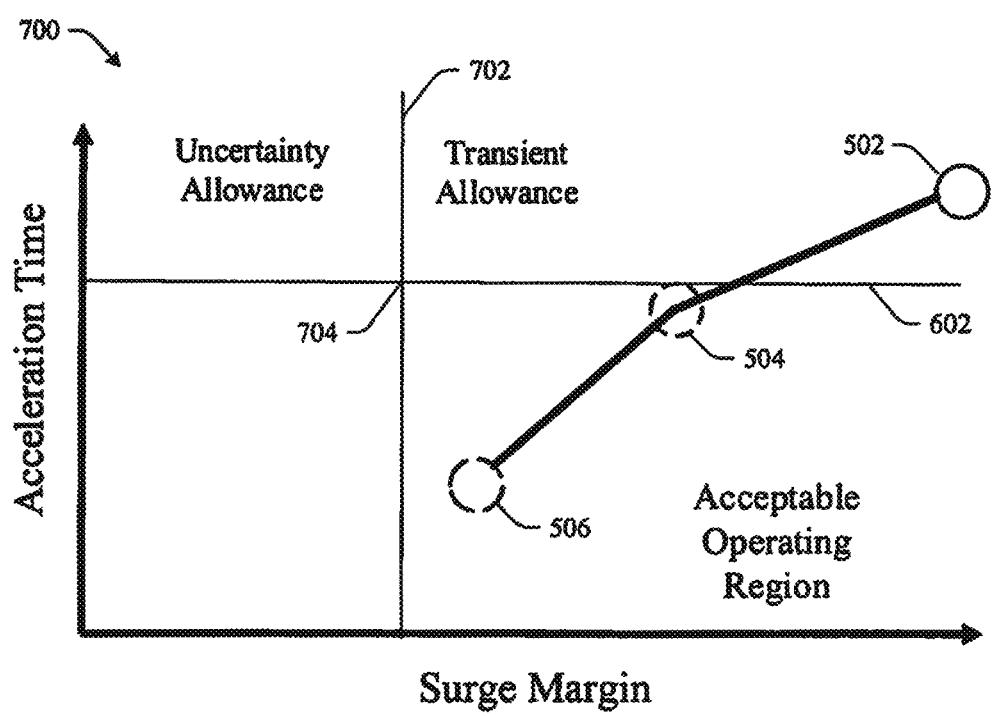
FIG. 7 is an acceleration plot combining the plots from FIGS. 5 and 6 illustrating responses that are in an acceptable operating region in accordance with an aspect of the innovation.

FIG. 7 is an acceleration plot 700 combining the plots from FIGS. 5 and 6 that illustrates which response (iteration) is in an acceptable operating region enclosed by a vertical line 702 and the performance parameter 602. As shown, the first iteration 502 is above the performance parameter 602 and thus, outside the acceptable operating region. Whereas, both the second and third iterations 504, 506 meet the performance parameter 602 and thus, are in the acceptable operating region. The ideal operating point is at the intersection 704 of the vertical line 702 and the performance parameter 602.

Figure 8:
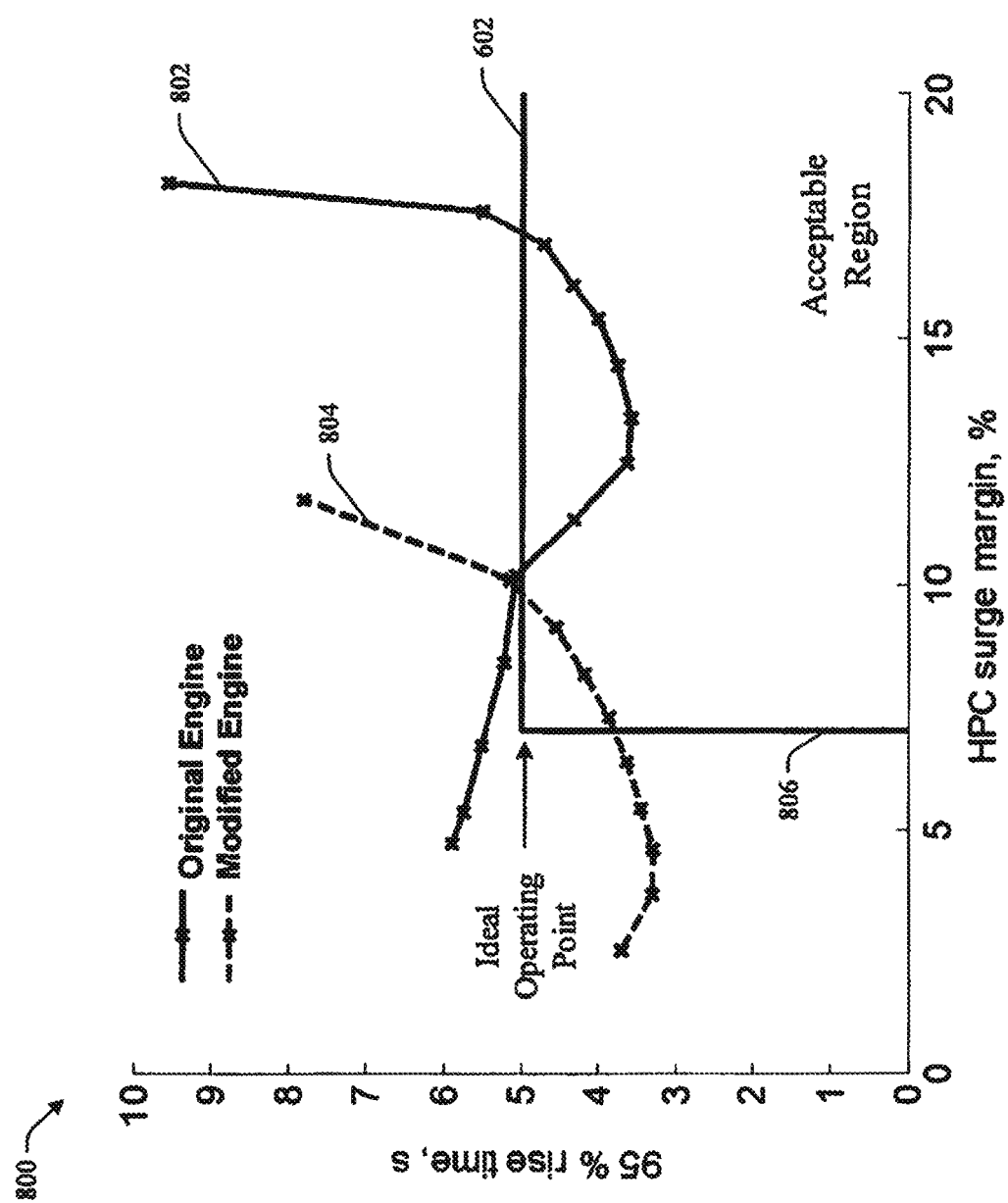
FIG. 8 is a dynamic performance evaluation plot demonstrating a trade-off between performance and operability in accordance with an aspect of the innovation.

FIG. 8 shows yet another plot 800 illustrating a response 802 of an original engine model and a response 804 of a modified engine model using DSA and TTECTrA, as described herein. The plot illustrates the relationship between the rise time and the HPC surge margin of each design and illustrates an acceptable region enclosed by the vertical line 806 and the performance parameter 602, which visually illustrates the trade-off. More specifically, as shown, the response 804 of the modified engine is closer to an ideal operating point while sacrificing less surge margin. The modified engine is also more efficient in terms of Thrust Specific Fuel Consumption (TSFC), which leads to lower operating costs.

Figure 9:
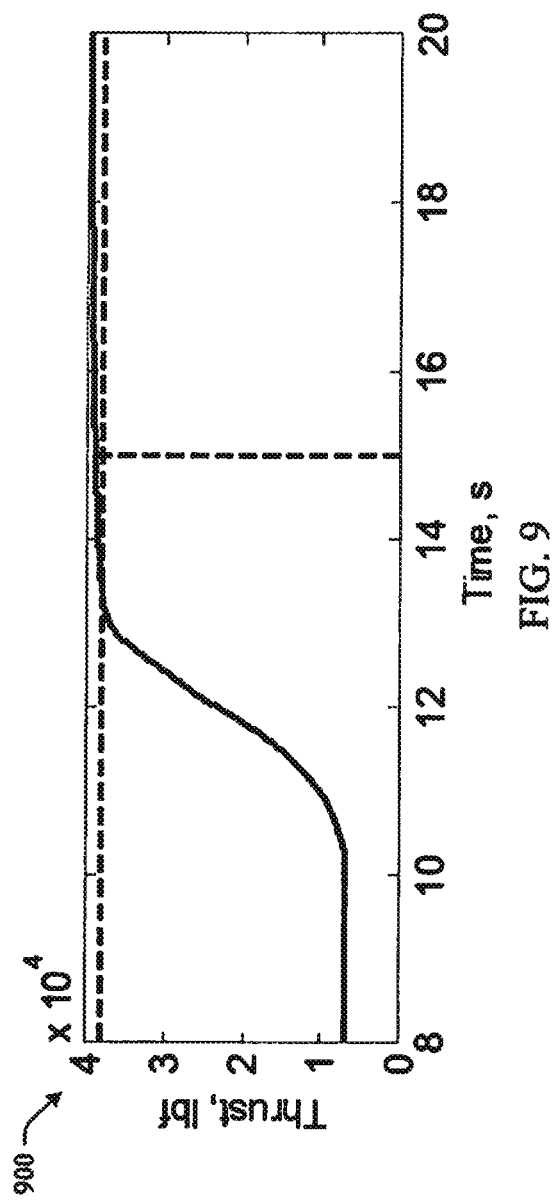
FIGS. 9-12 are example plots that illustrate results using DSA and a Tool for Turbine Engine Closed-loop Transient Analysis in accordance with an aspect of the innovation.
Figure 10:
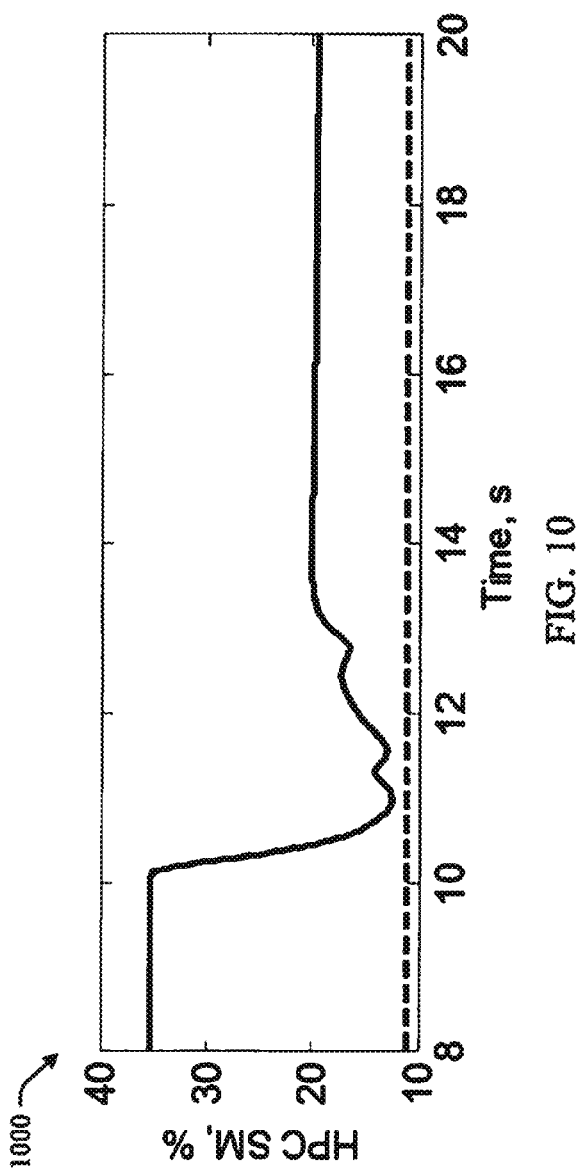
Figure 11:
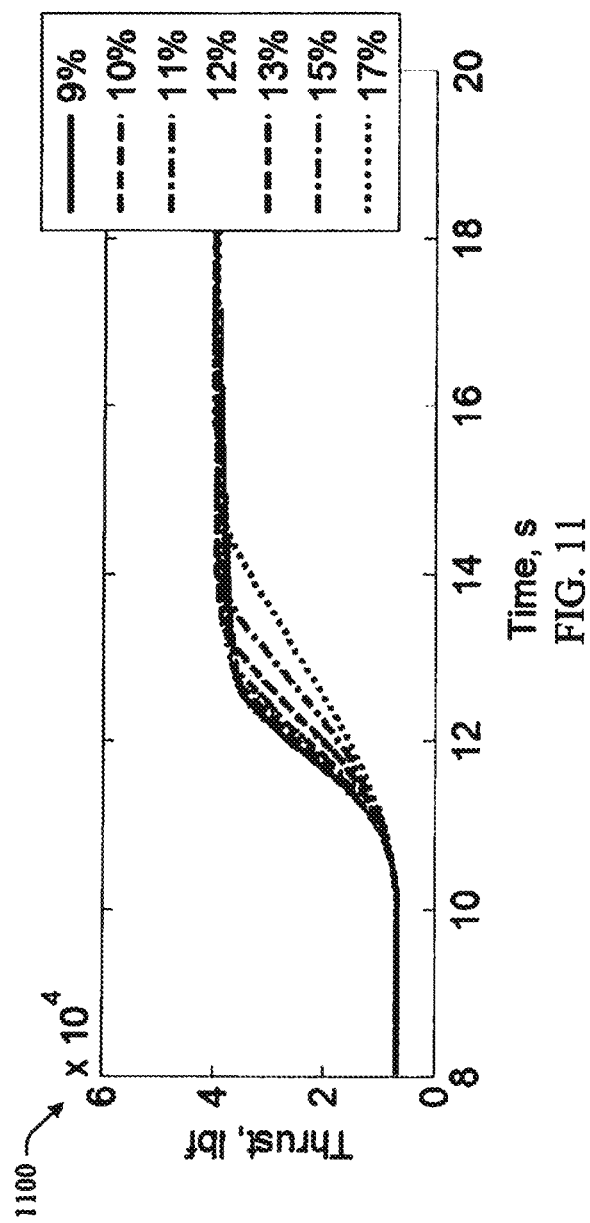
Figure 12:
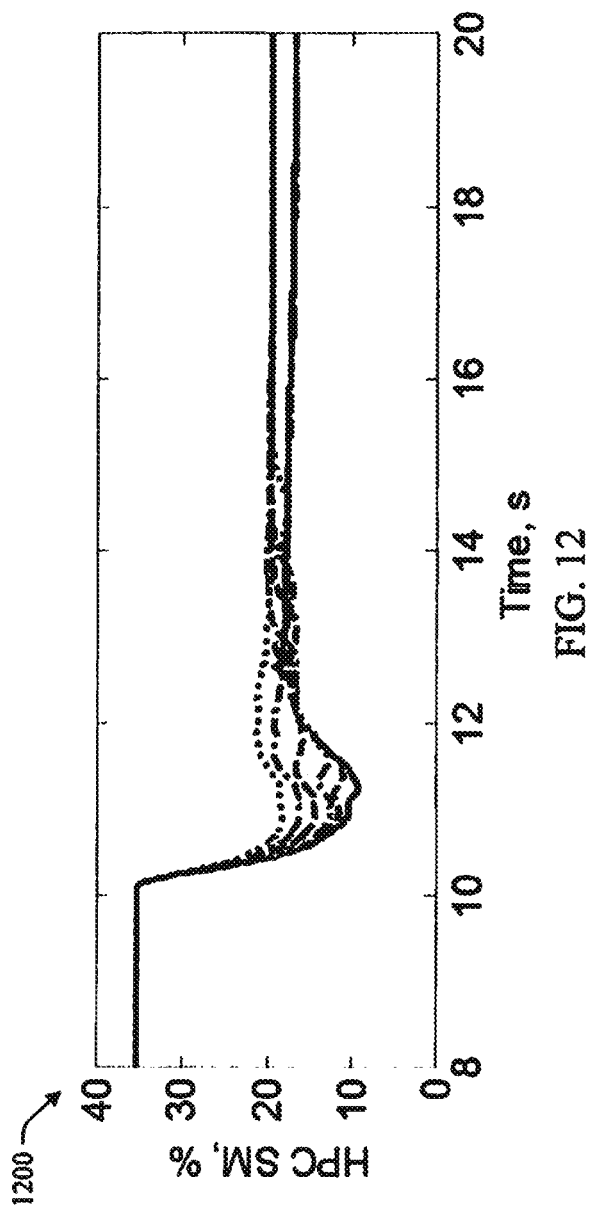

FIGS. 9-12 are example plots that illustrate results using DSA and the TTECTrA created controller. FIGS. 9 and 10 are plots showing acceleration 900 and the minimum HPC surge margin (9%) 1000 respectively for the original engine model. In order to meet requirements, the response must be above the horizontal dashed line before the response reaches the vertical dashed line. FIGS. 11 and 12 are example plots showing acceleration 1100 and the minimum surge margin (10-13%, 15%, and 17%) 1200 respectively for a number of iterations (modifications to the original engine model). These plots not only illustrate how DSA and TTECTrA allow a designer to improve an engine design, they also illustrate the relationship between acceleration and the HPC surge margin sacrificed for each design. Thus, the plots visually serve to illustrate the trade-off.

Figure 13:
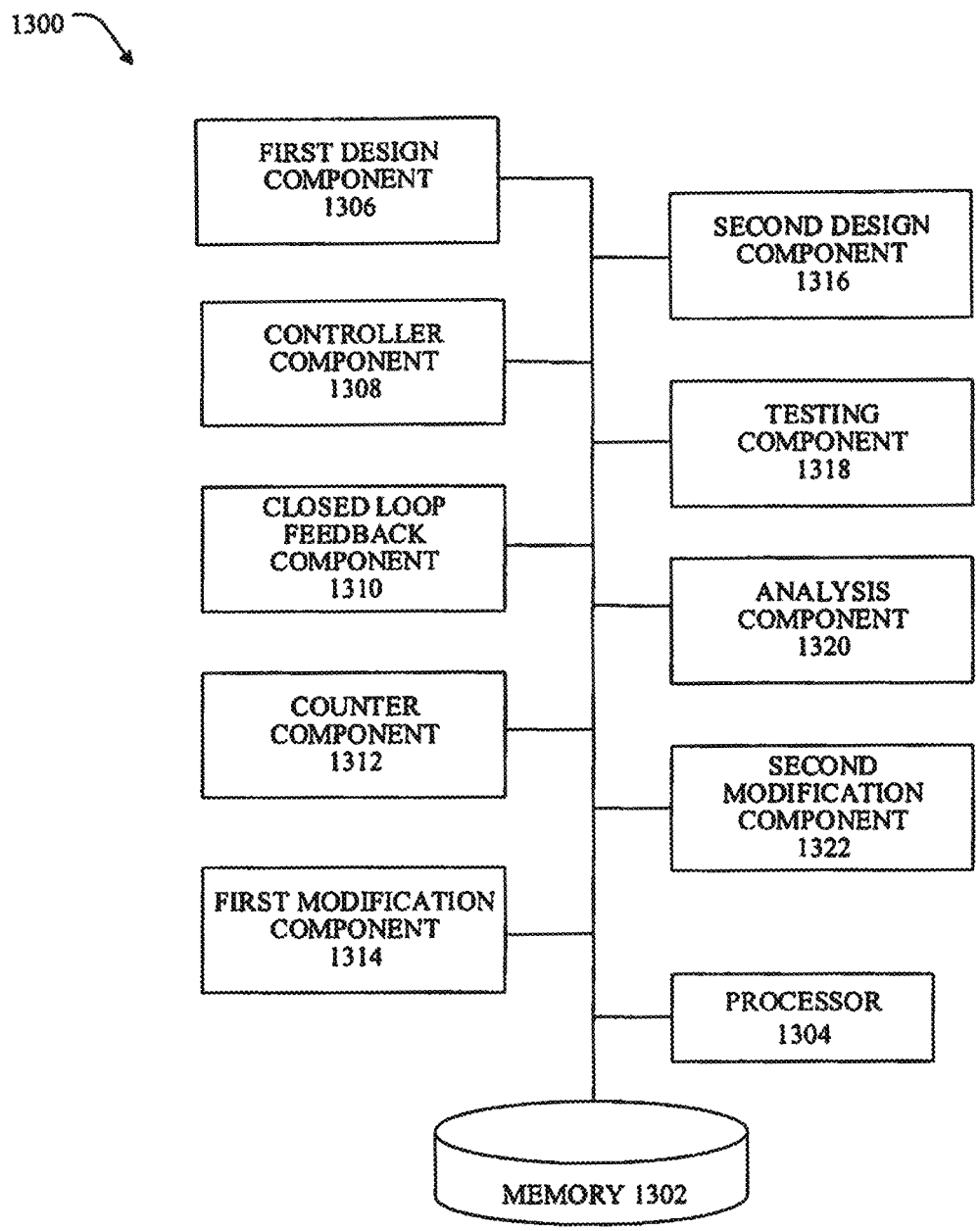
FIG. 13 is a non-limiting illustration of an example embodiment of an engine modeling system in accordance with an aspect of the innovation.

FIG. 13 is an example embodiment of an engine modeling system 1300 shown in block diagram form configured to perform Dynamic Systems Analysis incorporating TTEC-TrA described herein in accordance with an aspect of the innovation. The system 1300 may include at least one memory 1302 that may store computer executable components and/or computer executable instructions. The system 1300 may also include at least one processor 1304, communicatively coupled to the at least one memory 1302. The at least one processor 1304 may facilitate execution of the computer executable components and/or the computer executable instructions stored in the memory 1302. The term "coupled" or variants thereof may include various communications including, but not limited to, direct communications, indirect communications, wired communications, and/or wireless communications (e.g., with specialized banking machines and systems).

It is noted that although the one or more computer executable components and/or computer executable instructions may be illustrated and described herein as components and/or instructions separate from the memory 1302 (e.g., operatively connected to the memory 1302), the various aspects are not limited to this implementation. Instead, in accordance with various implementations, the one or more computer executable components and/or the one or more computer executable instructions may be stored in (or integrated within) the memory 1302. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple specialized components and/or as multiple instructions without departing from the example embodiments.

The system 1300 may also include a first design component 1306 configured to allow a designer to create an initial design and a controller component 1308 configured to create a controller as described herein. The system 1300 further includes a closed loop feedback component 1310 that includes a counter component 1312, a first modification component 1314, a second design component 1316, a testing component 1318, an analysis component 1320, and a second modification component 1322.

The counter component 1312 allows the designer to define the number of modifications the designer wants to perform on the initial engine model. The first modification component 1314 modifies an HPC requirement of the engine model. For example, in the example embodiment disclosed herein, the minimum surge margin limit requirement is adjusted (surge margin allowance is reduced) to increase the acceleration (or response time) of the engine. The second design component 1316 is configured to design a new limiter 210 (e.g., acceleration limiter) based on the modified HPC requirement. The testing component 1318 is configured to 1) test the modified (or new) controller, 2) record the results of the test, and 3) sends the results to the analysis component 1320. The analysis component 1320, after receiving the results from the testing component 1318, analyzes the results and determines if the results are acceptable (if the results meet performance and operability requirements). The second modification component 1322 modifies the initial design if the analysis component 1320 determines that the results are unacceptable (if the results do not meet performance and operability requirements).

The innovative DSA with TTECTrA described herein uses, as an example, a high-pressure compressor (HPC) and the surge margin of the HPC as the transient allowance to improve performance (acceleration/response time) of the engine while maintaining operability (sacrificing surge margin) of the engine. It is to be understood, however, that DSA with TTECTrA can use any engine component having a transient allowance where the transient allowance improves performance while maintaining and efficient operability of the engine. Thus, the example embodiment described herein and illustrated in the figures is for illustrative purposes only and is not intended to limit the scope of the innovation.

As disclosed herein, the innovation defines the relationship between the transient performance (acceleration time) and the operating margin (minimum surge margin) to illustrate the transient capability of the conceptual engine design and the trade-offs between performance and operating margin that could be made. As such, some advantages of the innovation include: (1) determining if the engine design is capable of meeting the requirements and if the transient requirement is to be met, how much margin is still remaining, (2) for a given transient performance, the designer can determine the operating margin and if this margin is greater than the required allowance, then the designer maybe able to modify the design (reduce the steady-state surge margin constraint) and make the engine more efficient or smaller. With the ability to more accurately define the remaining margin for the desired transient performance, the engine designer can reduce the steady-state constraint and increase the efficiency of the engine or possibly reduce the size of the engine.

Figure 14:
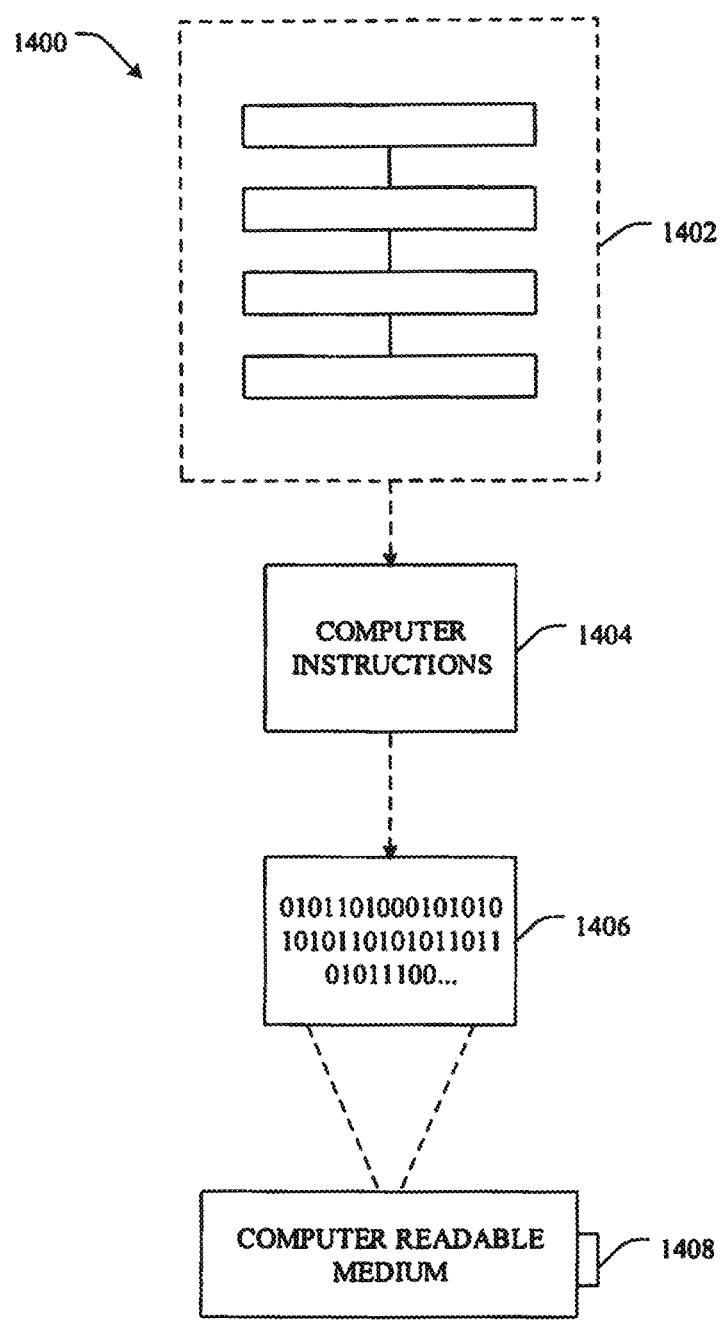
FIG. 14 illustrates an example, non-limiting computer-readable medium or computer-readable device including processor-executable instructions configured to embody one or more of the aspects set forth herein.

FIG. 14 is an example of one or more implementations that include a computer-readable medium including processor-executable instructions configured to implement one or more embodiments presented herein. An embodiment of a computer-readable medium or a computer-readable device devised in these ways is illustrated in FIG. 14, wherein an implementation 1400 includes a computer-readable medium 1402, such as a CD-R, DVD-R, flash drive, a platter of a hard disk drive, and so forth, on which is encoded computer-readable data 1404. The computer-readable data 1404, such as binary data including a plurality of zero's and one's as illustrated, in turn includes a set of computer instructions 1406 configured to operate according to one or more of the principles set forth herein.

In the illustrated embodiment 1400, the processor-executable computer instructions 1406 may be configured to perform a method 1408, such as the methods disclosed herein. In another embodiment, the processor-executable instructions 1404 may be configured to implement a system, such as the systems disclosed herein. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 15:
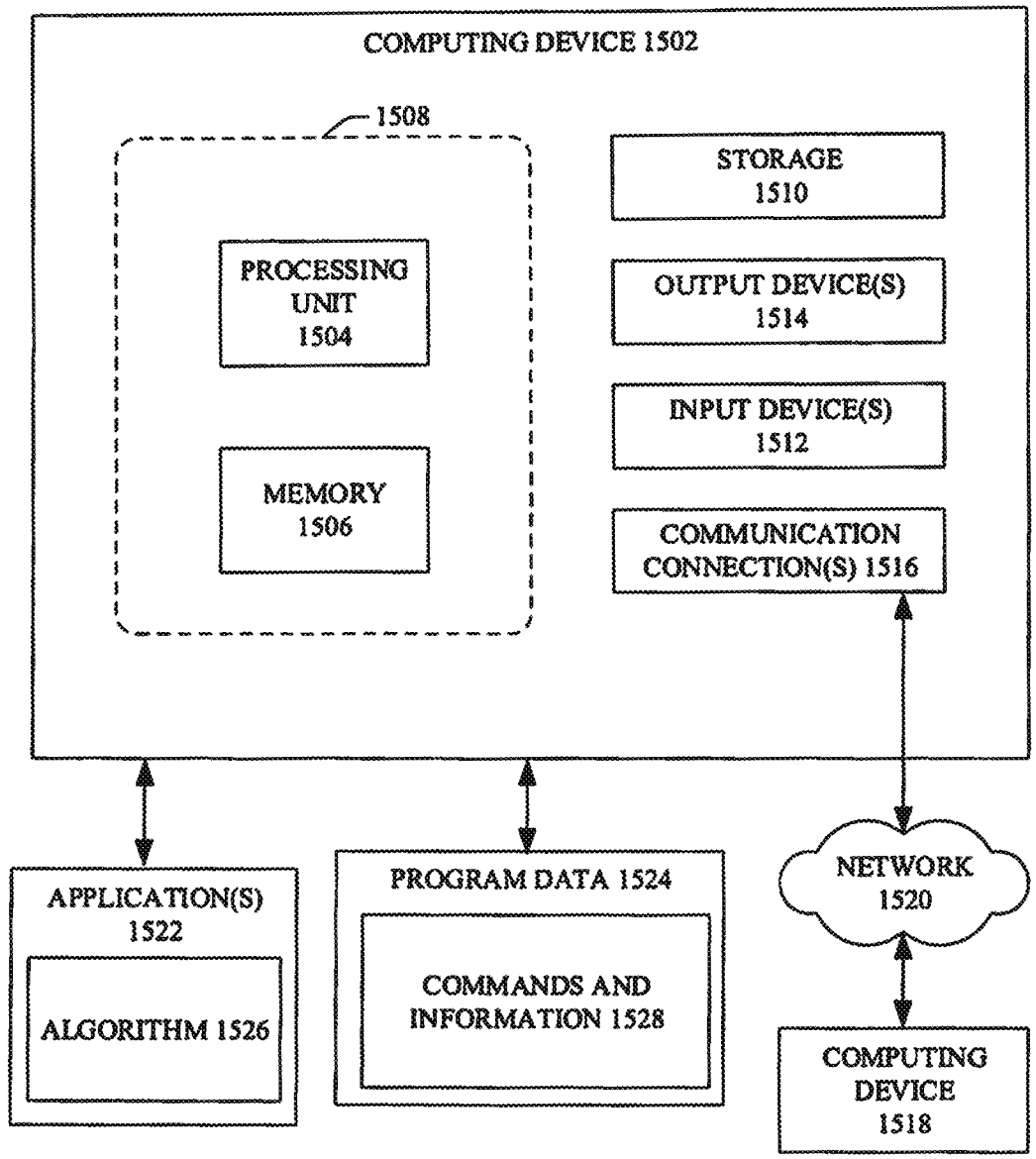
FIG. 15 illustrates an example, non-limiting computing environment where one or more of the aspects set forth herein are implemented, according to one or more aspects.

FIG. 15 and the following discussion provide a description of a suitable computing environment to implement embodiments of one or more of the aspects set forth herein. The operating environment of FIG. 15 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 15 illustrates a system 1500 that may include a computing device 1502 configured to implement one or more embodiments provided herein. In one configuration, the computing device 1502 may include at least one processing unit 1504 and at least one memory 1506. Depending on the exact configuration and type of computing device, the at least one memory 1506 may be volatile, such as RAM, non-volatile, such as ROM, flash memory, etc., or a combination thereof. This configuration is illustrated in FIG. 15 by dashed line 1508.

In other embodiments, the device 1502 may include additional features or functionality. For example, the device 1502 may include additional storage such as removable storage or non-removable storage, including, but not limited to, magnetic storage, optical storage, etc. Such additional storage is illustrated in FIG. 15 by storage 1510. In one or more embodiments, computer readable instructions to implement one or more embodiments provided herein are in the storage 1510. The storage 1510 may store other computer readable instructions to implement an operating system, an application program, etc. Computer readable instructions may be loaded in the at least one memory 1506 for execution by the at least one processing unit 1504, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1502 may include input device(s) 1512 such as keyboard, mouse, pen, voice input device, touch input device, infrared cameras, video input devices, or any other input device. Output device(s) 1514 such as one or more displays, speakers, printers, or any other output device may be included with the device 1502. The input device(s) 1512 and the output device(s) 1514 may be connected to the device 1502 via a wired connection, wireless connection, or any combination thereof. In one or more embodiments, an input device or an output device from another computing device may be used as the input device(s) 1512 and/or the output device(s) 1514 for the device 1502. Further, the device 1502 may include communication connection(s) 1516 to facilitate communications with one or more other devices, illustrated as a computing device 1518 coupled over a network 1520.

One or more applications 1522 and/or program data 1524 may be accessible by the computing device 1502. According to some implementations, the application(s) 1522 and/or program data 1524 are included, at least in part, in the computing device 1502. The application(s) 1522 may include an algorithm 1526 that is arranged to perform the functions as described herein including those described herein. The program data 1524 may include commands and information 1528 that may be useful for operation with the system and method disclosed herein.

Figure 16:
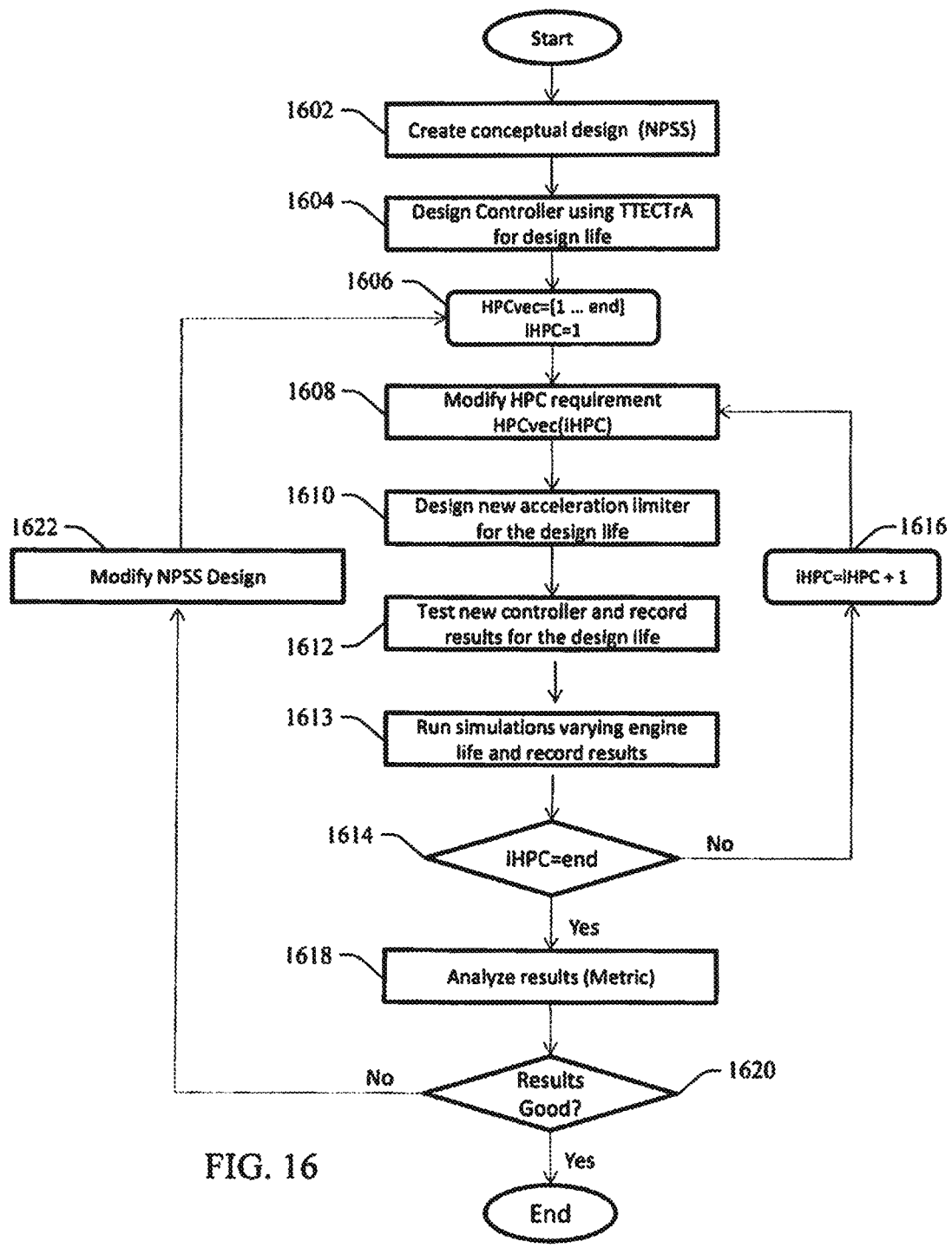
FIG. 16 is a flow chart illustrating a method of assessing the level of conservatism in an turbine engine in accordance with an aspect of the innovation.

FIG. 16 is a flow chart illustrating a method 1600 of assessing the level of conservatism in a turbine engine utilizing DSA and TTECTrA in accordance with an aspect of the innovation. At 1602, an initial (or original) engine model 322 is designed and incorporated into the simulation block 320 using a simulator (e.g., Numerical Propulsion System Simulation (NPSS)). Designing the initial engine model 322 includes determining an HPC surge margin allowance, uncertainty allowances, transient allowances, and target operating line as described herein. At 1604, a controller for the initial engine model is designed using TTECTrA, as defined herein. At 1606, a designer defined iteration (or counter) is created that allows the designer to define the number of HPC surge margin limits the designer would like to perform on the engine model. At 1608, the HPC requirement (limit) is modified. More specifically, the total surge margin allowance (limit) is adjusted (reduced) to increase/decrease the acceleration (or response time) of the engine in order to determine the relationship between performance and operability. At 1610, TTECTrA modifies the limiter (e.g., acceleration limiter) 310 thereby creating new limiter based on the modified HPC requirement, thus, creating a modified engine model. At 1612, the controller with the new limiter 310 is tested and the design life results are recorded. At 1613, simulations are run varying engine life and the results are recorded. At 1614, a decision is made to determine if the iteration is equal to the number of iterations (modifications), as defined by the designer (iHPC=End). If the determination is no, then at 1616, the iteration increases by one and the method returns to 1608 and the process repeats. If at 1614, the determination is yes, then at 1618, the results are analyzed and at 1620, a decision is made to determine if the results are acceptable. If the determination is no, then at 1622, the initial engine model is modified and the method returns to 1606 and the process is repeated. If at 1620, the determination is yes, the process ends.

Using the flow chart illustrated in FIG. 16, the designer can consider trade-offs and determine if a conceptual engine design with a fixed steady-state surge margin constraint, is capable of meeting the transient performance requirements, or if the steady-state surge margin constraint must be modified. The designer can also consider accepting a slighter less performing engine that still meets the transient requirement and obtaining additional margin. In this case where the designer chooses to accept a less performing engine that still meets the requirement, the designer may choose to reduce the surge margin constraint, redesign the engine, and perform the analysis (both steady-state and dynamic) with the modified design using the new constraint. The designer also can better define an acceptable region representing how close the designer would like to operate near the design constraint and performance goal. Using the flow chart illustrated in FIG. 16, the designer can quantify how much the design margins need to be modified to meet performance goals based on worst case information.

Figure 17A:
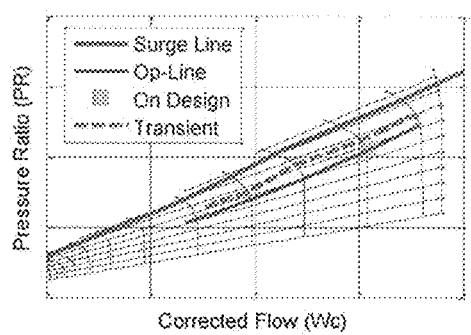
FIGS. 17A and 17B are example plots that illustrate results using DSA and a Tool for Turbine Engine Closed-loop Transient Analysis in accordance with an aspect of the innovation.
Figure 17B:
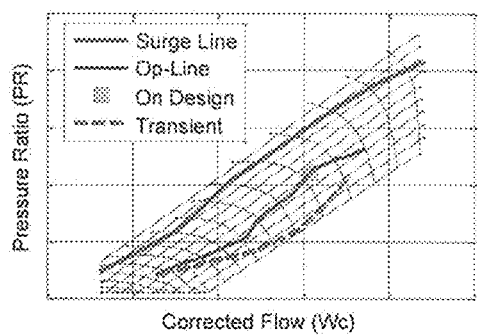

FIGS. 17A and 17B are plots depicting the HPC map (FIG. 17A) and LPC map (FIG. 17B), showing the on-design point near a cruise power level, and operating line (off design points), and response to a throttle transient from idle to takeoff.

In one example, a design case study was performed using the Commercial Modular Aero-Propulsion System Simulation 40k (CMAPSS40k) engine model. CMAPSS40k is a nonlinear, physics-based, component-level dynamic engine model with a closed-loop controller written in the MATLAB®/Simulink® environment (The MathWorks, Inc.). CMAPSS40k models a 40,000-pound thrust class (max power at 0 feet and 0.0 Mach), high-bypass, dual-spool turbofan engine. The low-pressure components—fan, low-pressure compressor (LPC), and low-pressure turbine (LPT)—are connected by the fan shaft, and the high-pressure components—high-pressure compressor (HPC) and high-pressure turbine (HPT)—are connected by the core shaft. The fan, compressors, and turbines are modeled using performance maps that relate the pressure ratio, mass flow rate, and corrected speed for each component.

The CMAPSS40k HPC and LPC maps are shown in FIGS. 17A and 17B, respectively. The steady-state data, which includes both the off-design and on-design points, was taken at an altitude of 0 ft, 0.0 Mach, referred to as sea level static (SLS), and standard day temperature, +0 degrees delta Temperature ambient (dTamb). The on-design point is taken at a power lever angle (PLA) of 68 degrees, which is approximately a cruise power setting at SLS. Off-design data is taken from 5,000 lb to 40,000 lb thrust, roughly PLA of 44 to 80 degrees, at SLS standard day conditions. Steady-state data taken at other flight conditions typically fall on the same steady-state line shown in FIGS. 17A and 17B, which is referred to as the operating line or op-line. The op-line is the collection of operating points (corrected flow and pressure ratios) that the compressors/turbines operate at near steady-state or for very small changes. Certain factors shift the steady-state op-line towards the surge line (reducing the surge margin), such as engine degradation, inlet distortion, etc. At the design point (cruise power setting), the HPC surge margin constraint is assumed to be 23%. Of the 23%, 11% is defined as the uncertainty stack which accounts for losses in surge margin due to engine degradation, machining tolerance, engine to engine variation, inlet distortion, and any other unknowns. The remaining 12% is reserved for the transient stack which accounts for the loss of surge margin attributed to the compressor operating closer to surge while transitioning from one operating point to another. In this example, the compressor will take a path that does not follow the steady-state op-line.

The CMAPSS40k engine model was integrated with the Tool for Turbine Engine Closed-loop Transient Analysis (TTECTrA). TTECTrA is an open source, semi-automated control design tool which can be easily integrated with subsonic turbine engine simulations developed in the MATLAB®/Simulink® (the MathWorks, Inc) environment. TTECTrA has the ability to integrate with cycle design and simulation tools such as the Numerical Propulsion System Simulation (NPSS) and the Toolbox for the Modeling and Analysis of Thermodynamic Systems (TMATS). At a single flight condition, defined by an altitude and Mach number, TTECTrA is capable of tuning a control system consisting of only the fundamental limiters and systems which influence the transient performance based on the user's specifications. The TTECTrA control system is a subset of the standard full-envelope controller for high-bypass turbofan engines found in other work. Simulation of the closed-loop system (controller and engine model) allows for realistically-achievable performance data to be collected and used for analysis.

Figure 18:
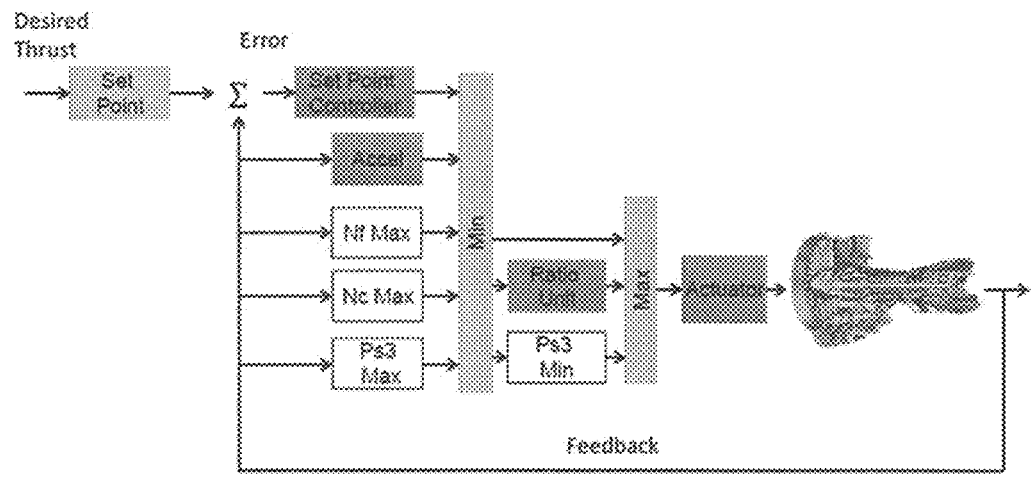
FIG. 18 illustrates a typical high-level closed-loop control diagram for a high-bypass turbofan engine model.

FIG. 18 illustrates a high-level closed-loop control diagram for a turbofan engine. The functions that are shaded dark grey have an impact on the dynamic performance of the closed loop system (e.g., the set point controller, etc.). The shaded blocks have an impact on the system operation. The shaded blocks are implemented in TTECTrA, while the white blocks are ignored for preliminary analysis.

The main idea behind dynamic systems analysis is to include dynamic performance information into the engine design process. For dynamic information to be included into the design process, the closed loop controller must be taken into account. The closed-loop controller is responsible for driving the engine from one power level to another in the appropriate time while ensuring safe operation, such as avoiding HPC surge. The tool for turbine engine closed-loop transient analysis (TTECTrA) has been developed to provide Matlab/Simulink users the ability to quickly design and simulate the closed-loop design for a given engine model. To use TTECTrA, the user must supply an engine model capable of integrating with Simulink and the TTECTrA controller block. The user then enters the control design constraints. TTECTrA will step through the control design process and allow the user to modify the control requirements during the design process, via a graphical user interface. Finally, TTECTrA produces the final output showing the response time and engine outputs.

FIG. 18 shows a standard high-level closed-loop control diagram for a high-bypass turbofan engine model. In this figure the set point, Min, and Max, functions, shown in gray, impact operation of the closed-loop system but not necessarily the dynamic performance. The steady-state limiters, shown in white that include Nf Max limiter, Nc Max limiter, Ps3Max limiter, and Ps3 Min limiter, are ignored since they do not impact the dynamic performance.

The remaining four main functions, shown in dark gray, impact the dynamic performance of the closed-loop system: the set point controller, accel limiter, ratio unit limiter (fuel flow divided by Ps3), and the actuator. The set point controller is designed to drive the engine to the desired power level with the use of a proportional integral (PI) controller. The set point controller is mainly responsible for responding to small changes in thrust and rejecting any disturbances. Increasing the controller gains and bandwidths leads to a faster thrust response. The accel function, short for acceleration limiter, is responsible for ensuring the engine does not enter a HPC surge, especially during a large, fast transient. Several methods have been proposed to protect against HPC surge, and can also help regulate the HPT inlet peak temperature reached during the transient. The acceleration limiter chosen for this example is an acceleration schedule, which regulates the core spool acceleration as a function of the current core flow corrected at station 25 (high pressure compressor inlet) conditions. The ratio unit limiter protects against both the LPC surge and minimum fuel to air ratio being violated. The actuator function is often implemented as a low pass filter that has a bandwidth close to that of the fuel flow actuator.

Figure 19:
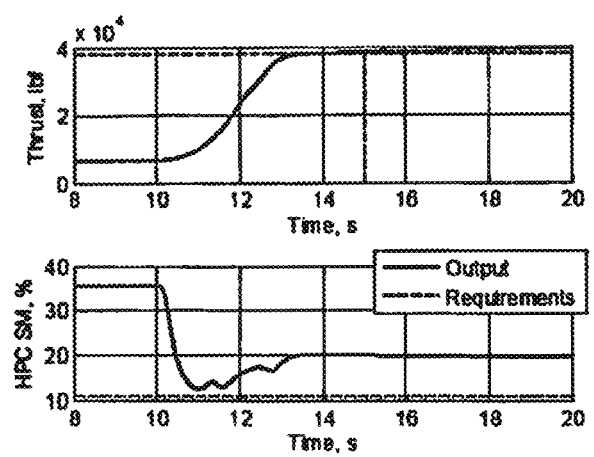
FIGS. 19 and 20 are example plots that illustrate results using DSA and a Tool for Turbine Engine Closed-loop Transient Analysis in accordance with an aspect of the innovation.

The TTECTrA controller may be integrated with the CMAPSS40k engine model. TTECTrA may be used to design and simulate the closed-loop system based on the TTECTrA control design parameters shown in Table 1. Based on these parameters, TTECTrA was used to design the controller and simulate the closed-loop response, which is shown in FIG. 19. The TTECTrA thrust response is shown in the top plot and HPC surge margin is shown in the bottom plot, showing the output of the closed loop system and the dynamic requirement.

In FIG. 19, the thrust requirement is to be able to reach 95% of max power in less than 5 seconds (top plot) and the HPC surge margin is to remain above 11% (bottom plot). As shown, both requirements are met. Using the TTECTrA tool, the acceleration limit value, which is the HPC surge margin, can be modified and the closed-loop response observed. As the acceleration limit value decreases, the response time also decreases, providing better transient performance for smaller operability margins (surge). This would shift the transient data on the HPC map, of FIG. 17A, closer to the surge line. Likewise, as the acceleration limit increases, the response time increases, moving the transient data on the HPC map, FIG. 17A, further from the surge line. From these simulations, the key pieces of information are 1) the time it takes to reach the 95% thrust requirement (performance) and 2) the minimum HPC surge margin (operability).

TABLE 1

| TTECTrA control design parameters | |
|---|---|
| Parameter | Value |
| Bandwidth | 1.75 Hz |
| Phase Margin | 45° |
| Feedback Filter Bandwidth | 10 Hz |
| Pre-filter Bandwidth | 10 Hz |
| Acceleration Limit | 11% |
| T40 Limit | 3,500° |
| Fuel to Air Ratio | 0.0325 |
| Deceleration Limit | 15% |

Figure 20:
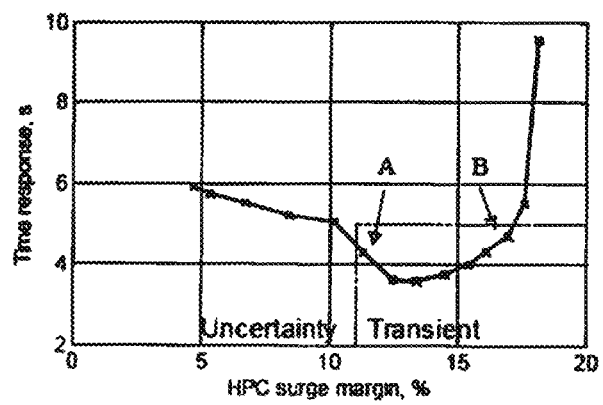

FIG. 20 is a plot depicting performance and operability for the baseline CMAPSS40k engine at 50% deterioration level and Sea Level Static/Standard day conditions. The performance and operability data may be collected for the varying HPC surge margin design values. Performance and operability data for varying acceleration limit values can be plotted against each other, as shown in FIG. 20. This plot shows the relationship between the minimum HPC surge margin (x-axis) and the 95% time response (y-axis) for CMAPSS40k at sea level static standard day conditions for 50% degraded engine. The acceleration limit from TTECTrA, 11% from Table 1, is plotted as well as the 5% time response limit. Any of the acceleration limits which lies to the right of the acceleration limit, minimum HPC surge margin greater than 11%, and has a time response less than 5% is an acceptable closed-loop solution. In FIG. 20, the point marked as A with a surge margin of 115% marks the response with the lowest acceptable surge margin remaining, while point B at a surge margin of 17% represents the slowest acceptable response time. Any controller designed with a minimum surge margin between these points is deemed acceptable.

FIG. 20 contains additional information regarding the operability margins. The acceleration limit used in TTECTrA represents the uncertainty stack, which is the region to the left of the 11% surge and noted as Uncertainty in FIG. 20. The uncertainty stack accounts for surge margin losses due to engine degradation, inlet distortion, engine to engine variations, etc. In FIG. 20, any data points to the left of the 11% HPC surge margin limit corresponds to the closed loop design violating the design constraint. The region to the right of the 11% limit in FIG. 20 up to the surge margin constraint value is the transient stack. The transient stack is the amount of surge margin reserved for transient operation. In general, as the transient stack increases the engine response time should decrease (better performance). Having too large of a transient stack implies that the engine design constraint may be too large and the current engine design may not be optimal in terms of weight, efficiency, etc. The transient stack should be sized such that the data curve of FIG. 4 intersects the performance and operability limit lines; 11% HPC surge margin and 5 second time response.

Figure 21:
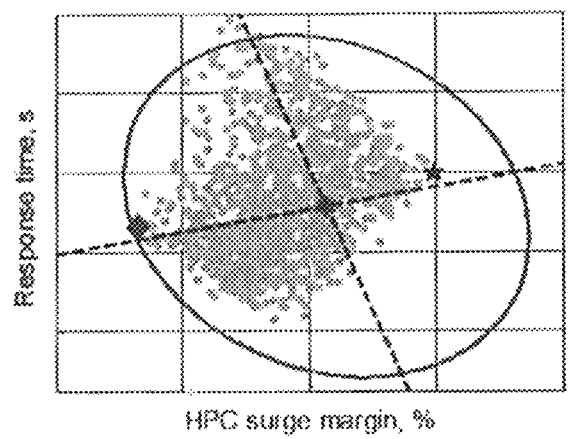
FIG. 21 is a performance and operability plot that illustrates results using DSA and a Tool for Turbine Engine Closed-loop Transient Analysis in accordance with an aspect of the innovation.

FIG. 21 is a performance and operability plot for one thousand randomly aged engines and three known life conditions (50 hour engine (pentagram), mid-life (hexagram), and end-of-life (diamond). Also shown is an ellipse which fits the collected data and is used to characterize the data to the performance level.

The closed-loop system should provide some guaranteed level of performance throughout the engine life cycle. As the engine ages, both performance and operability are effected.

With information regarding the change in performance and operability over the engine life cycle, better design choices or constraints can be made to optimize the performance while ensuring sufficient margins exist. The previous example focused on developing a methodology to assess the capability of an engine design to meet closed-loop performance and operability margins. The focus of this example is capturing the effect of engine aging, describing the impact on the performance level and operability, and developing design requirements to meet the performance level requirements throughout the engine life cycle.

The first step is to collect the deterioration data. In particular, the deterioration data is collected from two sets of data; 1) known life conditions (new 50 hour engine, mid-life engine, and end of life engine), and 2) randomly aged conditions that are bounded by the new and end of life deterioration values. For this example, a health parameter vector is defined which contains a flow and efficiency modifier for each of the major component of the engine; fan, LPC, HPC, HPT, and LPT. Each element of the health parameter vector will be between 0 (50 hour engine value) and an end of life value of 1. The TTECTrA tool, integrated with the CMAPSS40k engine model, is used to design the controller for a particular acceleration limit and baseline engine (mid-life). With this controller, the engine is then simulated with both the three known life conditions and one thousand randomly aged conditions. FIG. 21 shows the response time and HPC surge margin closed-loop simulation data with a controller designed for a particular acceleration limit. In FIG. 21, the three known life conditions, 50 hour engine (pentagram), mid-life (hexagram), and end-of-life (diamond), and the one-thousand randomly aged engines are shown as dots. The FIG. 21 data shows how much the response time and HPC surge margin changes based on engine degradation.

Figure 22:
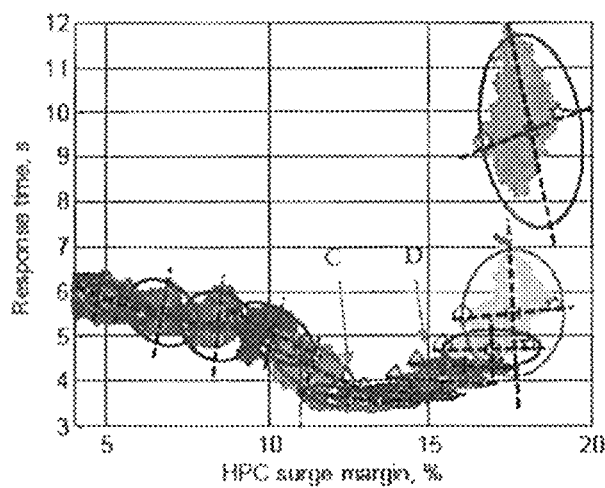
FIGS. 22-24 are example plots that illustrate results using DSA and a Tool for Turbine Engine Closed-loop Transient Analysis in accordance with an aspect of the innovation.

FIG. 22 is a plot depicting Monte Carlo data and ellipse for the attempted acceleration limit values applied to the CMAPSS40k engine.

Once the closed-loop data is collected, an ellipse which fits the data is constructed. The length and rotation of the ellipse x-axis is based on the known life conditions and the length of the top and bottom half of the ellipse is based on the Monte Carlo data. From this, four ellipse parameters are used to describe the ellipse; x-axis length, y-axis length from the center to the bottom of the ellipse, the y-axis length from the center to the top of the ellipse, and rotation of the ellipse x-axis. Detail regarding this method can be found in Zinnecker, A. M., and Csank, J. T., "A methodology to assess the capability of engine designs to meet closed-loop performance and safety requirements," 51st AIAA/SAE/ASEE Joint Propulsion Conference, AIAA 2015-4023, Orlando, Fla., Jul. 27-29, 2015.

This process of collecting and fitting an ellipse around the Monte Carlo data is repeated for different acceleration limit design values. The idea is to collect enough data to have an approximation of how performance varies throughout both the engine life cycle and with varying acceleration limit. FIG. 22 shows the Monte Carlo data and the defined ellipses for the CMAPSS40k engine. The ellipses change as a function of the acceleration limit value. The four ellipse parameters are described for each acceleration limit that has been defined. Additionally, a binary search procedure can be implemented to find the limiting cases meeting either requirement. This search procedure relies on curve fits and defined relationships to find the limiting case. Zinnecker et al., contains more information regarding the binary search procedure. With bounds known, any acceleration limiter designed between the two bounds results in a controller that meets both the operability and performance levels.

From FIG. 22, the surge margin designs which meet both requirements throughout the life of the engine can be identified. From FIG. 22, point C with a surge margin of 12.5% designed at mid-life, is the lowest acceptable design which ensures that the 11% minimum surge margin is met throughout the life of the engine. In this case, all the data points are greater than 11%. Point D at a surge margin of 16%, represents the slowest response time to meet the 5 second requirement throughout the life of the engine. With the deterioration data added to the analysis, the acceptable range has decreased from 11.5% to 17% (from FIG. 20 and operability tradeoff throughout the life of the engine.

Figure 23:
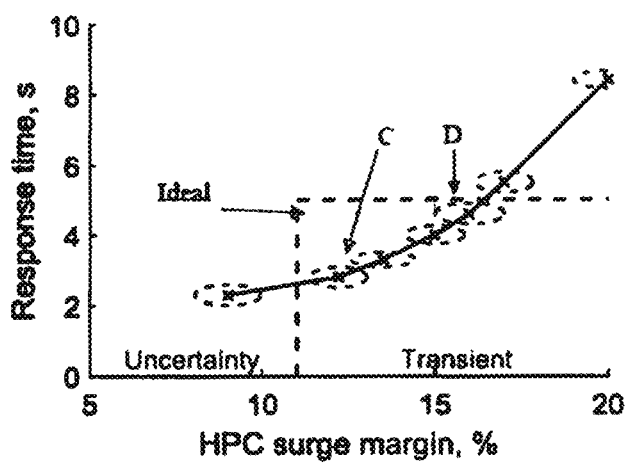

FIG. 23 depicts a performance and operability plot showing where the ideal operating point is.

Analyzing the performance and operability relationship allows for tighter margins to be designed. TTECTrA was applied to the CMAPSS40k engine model and used to create the relationship between the HPC surge margin and the closed loop response time. This was accomplished by redesigning the acceleration schedule (limiter) for varying surge margins and executing a closed-loop simulation. The minimum HPC surge margin and settling time was plotted as shown in FIG. 20. FIG. 20 shows that the performance requirement can be met (response time less than 5 seconds) with a minimum surge margin of 16%, which is greater than the current limit of 11%. The range of acceptable surge margin controllers, which meet the 11% minimum surge margin remaining and 5 second response time, was determined to be between 11.5% and 17%. The impact of engine deterioration was included in the analysis, and the relationship between performance and operability was illustrated in FIG. 22. FIG. 22 shows that additional margin is required to meet the performance requirement throughout the life cycle since both the surge margin and performance are impacted by the engine degrading. Even with the impact of degradation, the performance requirement is met with additional margin remaining. FIG. 22 also shows that the acceptable surge margin range decreased 11.5% to 17% (from FIG. 20) to 12.5% to 16% with the addition of the deterioration data.

The real benefit of this analysis is to identify any margins which may be overly conservative. FIG. 23 shows the generic relationship between performance and operability. The response time and HPC surge margins are identified for varying acceleration limit values, shown as "x" in FIG. 23, to create the nominal relationship shown by the curved line. The engine model is then randomly aged to obtain data and ellipses are drawn to encapsulate the Monte Carlo data, shown as the dashed lines. FIG. 23 shows that the performance requirement can be met for the nominal engine with a minimum surge margin of approximately 16%. With engine degradation included, the minimum surge margin would decrease to about 14%. The uncertainty stack shown in FIG. 23 is 11%, which means that with accounting for engine degradation, the current engine constraint has an additional 3% surge margin which is calculated by taking the difference of the surge margin required to meet the performance and the uncertainty stack (14%-11%). This would approximately shift the line over to the left and an acceleration limiter would be defined to operate near the desired operating point shown in FIG. 23 as the star labeled Ideal. In this example, the transient stack is perfectly defined to meet the performance and operability margin.

Figure 24:
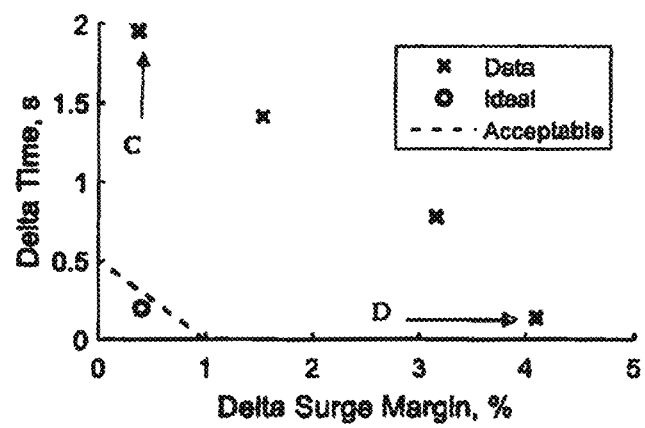

FIG. 24 depicts a generic performance and operability constraint plot, comparing the ideal constrains to the current constraints. Ideally the design would fall into the target range.

The data contained in FIG. 23 can be plotted to show the distance to each constraint from the closest point on the ellipse. For each point of FIG. 23, the minimum x-coordinate and maximum y-coordinate is determined. The delta surge margin constraint is computed as the difference between the minimum x-coordinate and the surge margin constraint (11%). The delta time constraint is computed as the difference between the response time requirement (5 s) and the maximum y-coordinate. This data is shown as the "x" in FIG. 24. In the ideal situation, the design point would be at, or very close to, the origin (0,0). However, the designer may choose to define an acceptable band for the design to operate at to avoid violating either constraint. In this example, an acceptable time constraint of 0.5 seconds and 1% surge margin is chosen and plotted in FIG. 24 (dashed line). The ideal design point is plotted as the circle, which shows that the ideal design point is within the acceptable band.

According to an aspect, the innovation includes dynamic system analysis concept, tools, and potential benefit. Current systems analysis processes rely on steady-state design constraints to account for dynamic performance, such as for high pressure compressor (HPC) surge margin. The HPC surge margin constraint is intended to account for steady-state losses due to uncertainty, manufacturing tolerances, engine degradation, etc, and for a temporary loss of surge margin associated with quickly accelerating from a low power to high power. The dynamic portion of the constraint is usually based on previous designs and assumptions. The goal of the dynamic systems analysis according to the innovation is to estimate and better define how much margin is really required during engine transients. In this case, the steady-state design constraint may be able to change and a more efficient or lighter engine can be potentially designed. A generic performance and operability constraint plot was constructed to better identify the margin for each constraint and identify an acceptable band in which the designers can design for.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method of analyzing aircraft engine performance comprising:
    designing an initial engine model with a specified surge margin allowance;
    designing a controller for the initial engine model;
    modifying a high pressure compressor requirement of the initial engine model by modifying the surge margin allowance;
    designing a transient allowance limiter comprising an acceleration limiter to restrict fluid flow during acceleration;
    creating a modified engine model;
    testing a controller of the modified engine model using the modified surge margin allowance to determine changes to the performance and/or operability of the modified engine model from the initial engine model;
    running a simulation by varying engine life to determine how performance varies throughout both the engine life cycle and with varying acceleration limit;
    determining if a designer defined number of modifications is satisfied; and
    repeating the method beginning at modifying a high pressure compressor requirement of the initial engine model if the designer defined number of modifications is not satisfied.

2. The method of claim 1 further comprising analyzing results of the testing if the designer defined number of modifications is satisfied to determine if the results of the modified engine model meets performance and operability requirements.

3. The method of claim 2 further comprising designing a new initial engine model if the modified engine model does not meet performance and operability requirements and repeating the method.

4. The method of claim 3, wherein specifying a surge margin allowance of the initial engine model includes determining an uncertainty allowance and a transient allowance of the initial engine model.

5. The method of claim 4, wherein the uncertainty allowance and transient allowance produce a target operating line of the initial engine model.

6. The method of claim 5, wherein the uncertainty allowance includes mechanical imperfections and tolerances, inlet distortion, tip clearances, and engine degradation.

7. The method of claim 1, wherein modifying a high pressure compressor requirement of the initial engine model includes reducing the surge margin allowance to increase or decrease a response time of the initial engine model to achieve an optimum balance between performance and operability.

8. The method of claim 7, wherein the acceleration limiter limits a reduction in the surge margin to protect the modified engine model from entering a surge condition.

9. The method of claim 1, wherein the transient allowance limiter comprises an acceleration limiter and a deceleration limiter.

10. A computing system for analyzing an aircraft engine model to improve performance and operability comprising:
  a processor that executes the following computer executable components stored in a memory;
  a first design component that allows a designer to create an initial engine model with a specified surge margin allowance;
  a first modification component that modifies a high pressure compressor requirement of the initial engine model by modifying the surge margin allowance;
  a second modification component that designs a transient allowance limiter of the initial engine model comprising an acceleration limiter to restrict fluid flow during acceleration;
  a second design component that creates a modified engine model based on the results of the first modification component and the second modification component;
  a testing component that allows the designer to test a controller of the modified engine model;
  an analysis component that analyzes the results and determines if the results meet performance and/or operability requirements; and
  a third modification component that modifies the initial engine model if the analysis component determines that the results are unacceptable.

11. The system of claim 10 further comprising a counter component that allows the designer to define a number of modifications the designer wants to perform on the initial engine model.

12. The system of claim 10, wherein the transient allowance limiter is an acceleration limiter and the modification component reduces the surge margin allowance of the acceleration limiter to increase or decrease a response time of the initial engine model to achieve an optimum balance between performance and operability.

13. The system of claim 12, wherein the acceleration limiter limits a reduction in the surge margin allowance to protect the modified engine model from entering a surge condition.

14. The system of claim 10, wherein the testing component further records the results of the test to the modified high pressure compressor requirement and the transient allowance limiter and sends the results to the analysis component.

15. The system of claim 14, wherein the surge margin allowance includes an uncertainty allowance and a transient allowance of the initial engine model.

16. The system of claim 15, wherein the uncertainty allowance and transient allowance produce a target operating line of the initial engine model.

17. A non-transitory computer-readable storage device storing executable instructions that, in response to execution, cause a computing system comprising a processor to perform operations comprising:
  analyzing an aircraft engine model to improve a performance and operability of the engine model comprising:
  designing an initial engine model with a specified surge margin allowance;
  reducing the surge margin allowance of the initial engine model;
  designing a transient allowance limiter comprising an acceleration limiter to restrict fluid flow during acceleration;
  creating a modified engine model;
  testing a controller of the modified engine model to determine if the reduction in the surge margin allowance provides an optimum balance between performance and/or operability of the modified engine model;
  running a simulation by varying engine life and observing the impact over the anticipated engine life;
  determining if a designer defined number of modifications is satisfied; and
  repeating beginning at reducing the surge margin allowance of the initial engine model if the designer defined number of modifications is not satisfied.

18. The computer-readable storage device of claim 17, wherein if a designer defined number of modifications is satisfied, the operations further comprising analyzing results of the testing to determine if the results of the modified engine model meets the performance and operability requirements and repeating the operations beginning at designing an initial engine model having a surge margin allowance if the modified engine model does not meet performance and operability requirements.

* * * * *